United States Patent
Zhao

(10) Patent No.: US 12,317,072 B2
(45) Date of Patent: May 27, 2025

(54) WIRELESS LOCAL AREA NETWORK AUTHENTICATION METHOD AND APPARATUS, ELECTRONIC DEVICE, AND STORAGE MEDIUM

(71) Applicant: Tencent Technology (Shenzhen) Company Limited, Shenzhen (CN)

(72) Inventor: Qian Zhao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 386 days.

(21) Appl. No.: 17/986,719

(22) Filed: Nov. 14, 2022

(65) Prior Publication Data

US 2023/0071813 A1 Mar. 9, 2023

Related U.S. Application Data

(63) Continuation of application No. PCT/CN2021/129267, filed on Nov. 8, 2021.

(30) Foreign Application Priority Data

Dec. 15, 2020 (CN) .......................... 202011481963.X

(51) Int. Cl.
  *H04W 12/06* (2021.01)
  *H04W 12/041* (2021.01)
  *H04W 84/12* (2009.01)
(52) U.S. Cl.
  CPC ......... *H04W 12/06* (2013.01); *H04W 12/041* (2021.01); *H04W 84/12* (2013.01)
(58) Field of Classification Search
  CPC .............................. H04L 9/0819; H04W 12/06
  (Continued)

(56) References Cited

U.S. PATENT DOCUMENTS 11,197,157 B2 * 12/2021 Wang .................. H04L 63/0892
2020/0366481 A1 * 11/2020 Pakkan ................. H04W 12/35

FOREIGN PATENT DOCUMENTS

| CN | 105491093 A | 4/2016 |
| CN | 106941405 A | 7/2017 |

(Continued)

OTHER PUBLICATIONS

Tencent Technology, ISR, PCT/CN2021/129267, Jan. 26, 2022, 2 pgs.

(Continued)

*Primary Examiner* — Kiet M Doan
(74) *Attorney, Agent, or Firm* — Morgan, Lewis & Bockius LLP

(57) ABSTRACT

A cloud server receives information to be authenticated sent by a wireless access point device. The information to be authenticated contains verification information generated by a terminal to be authenticated. The terminal is a wireless terminal provided by the wireless access point device for accessing a wireless local area network. The cloud server determines that it locally stores a verification key that matches the terminal. The cloud server obtains the locally stored verification key and performs verification on the verification information according to the verification key. When the verification on the verification information succeeds, the cloud server the verification key to the wireless access point device so that the wireless access point device associatively stores the verification key with a terminal identifier of the terminal and completes authentication on the terminal according to the verification key.

20 Claims, 9 Drawing Sheets

(58) Field of Classification Search
USPC .......................................................... 370/331
See application file for complete search history.

(56) References Cited

FOREIGN PATENT DOCUMENTS

| | | | |
|---|---|---|---|
| CN | 111866881 | A | 10/2020 |
| CN | 112672351 | A | 4/2021 |
| EP | 3413508 | A1 | 12/2019 |

OTHER PUBLICATIONS

Tencent Technology, WO, PCT/CN2021/129267, Jan. 26, 2022, 4 pgs.
Tencent Technology, IPRP, PCT/CN2021/129267, Jun. 13, 2023, 5 pgs.

\* cited by examiner

WIRELESS LOCAL AREA NETWORK AUTHENTICATION METHOD AND APPARATUS, ELECTRONIC DEVICE, AND STORAGE MEDIUM

CROSS-REFERENCE TO RELATED APPLICATIONS

This application is a continuation application of PCT Patent Application No. PCT/CN2021/129267, entitled "WIRELESS LOCAL AREA NETWORK AUTHENTICATION METHOD AND APPARATUS, AND ELECTRONIC DEVICE AND STORAGE MEDIUM" filed on Nov. 8, 2021, which claims priority to Chinese Patent Application No. 202011481963.X, filed with the State Intellectual Property Office of the People's Republic of China on Dec. 15, 2020, and entitled "WIRELESS LOCAL AREA NETWORK AUTHENTICATION METHOD AND APPARATUS, ELECTRONIC DEVICE, AND STORAGE MEDIUM", all of which are incorporated herein by reference in their entirety.

FIELD OF THE TECHNOLOGY

This application relates to the field of wireless communication technologies, and in particular, to a wireless local area network authentication method and apparatus, an electronic device, and a computer-readable storage medium.

BACKGROUND OF THE DISCLOSURE

The market of the enterprise wireless local area network (Wi-Fi) is huge, and generally, there are a large quantity of wireless local area network connection requirements in the enterprises wireless local area network.

In the field of wireless communication, a wireless terminal, when using its own wireless local area network (Wi-Fi) function, usually needs to perform at least scanning, authentication, and association processes between the wireless terminal and a wireless access point device, to enable the wireless terminal to be connected to a wireless local area network. Currently, in an enterprise wireless local area network system, a wireless local area network authentication process is usually processed by an access controller (AC) device or a wireless access point (AP) device.

SUMMARY

Embodiments of this application provide a wireless local area network authentication method and apparatus, an electronic device, and a computer-readable storage medium from different aspects.

According to an aspect of the embodiments of this application, a wireless local area network authentication method is provided, performed by a cloud server (e.g., a server system, a computer server, etc.). The method includes: receiving information to be authenticated transmitted by a wireless access point device, the information to be authenticated including verification information generated by a terminal to be authenticated, the terminal being a wireless terminal provided by the wireless access point device for accessing a wireless local area network. The method includes: when the cloud server locally stores a verification key matching the terminal to be authenticated, the cloud server locally obtains the verification key matching the terminal to be authenticated. The method includes: performing verification on the verification information according to the verification key; and returning the verification key to the wireless access point device when the verification on the verification information succeeds, so that the wireless access point device associatively stores the verification key and a terminal identifier of the terminal to be authenticated, and completes authentication on the terminal to be authenticated according to the verification key.

According to an aspect of the embodiments of this application, a wireless local area network authentication method is provided, performed by a wireless access point device, and including: locally searching for, according to a terminal identifier of a to-be-authenticated terminal when a wireless local area network connection request transmitted by the to-be-authenticated terminal is received, a verification key associatively stored with the terminal identifier, the verification key associated with the terminal identifier being issued by a cloud server after the cloud server obtains, after receiving to-be-authenticated information historically transmitted by a wireless access point device, a verification key matching the to-be-authenticated terminal, and verification performed according to the obtained verification key by the cloud server on verification information included in the to-be-authenticated information succeeds, the verification information being generated by the to-be-authenticated terminal; and completing, when the verification key associatively stored with the terminal identifier is found, authentication on the to-be-authenticated terminal according to the verification key, and establishing, in response to the wireless local area network connection request, a wireless local area network connection with the to-be-authenticated terminal after the authentication succeeds.

According to an aspect of the embodiments of this application, a wireless local area network authentication apparatus is provided, applicable to a cloud server, and including: a to-be-authenticated information receiving module, configured to receive to-be-authenticated information transmitted by a wireless access point device, the to-be-authenticated information including verification information generated by a to-be-authenticated terminal, the to-be-authenticated terminal being a wireless terminal to be accessed to a wireless local area network provided by the wireless access point device; a key obtaining and verification module, configured to locally obtain, when an associative storage module stores a verification key matching the to-be-authenticated terminal, the verification key matching the to-be-authenticated terminal, and perform verification on the verification information according to the verification key; and a key information returning module, configured to return the verification key to the wireless access point device when the verification on the verification information succeeds, so that the wireless access point device associatively stores the verification key and a terminal identifier of the to-be-authenticated terminal, and completes authentication on the to-be-authenticated terminal according to the verification key.

According to an aspect of the embodiments of this application, a wireless local area network authentication apparatus is provided, applied to a wireless access point device, and including: a verification key searching module, configured to locally search for, according to a terminal identifier of a to-be-authenticated terminal when verification information transmitted by the to-be-authenticated terminal is received, a verification key associatively stored with the terminal identifier, the verification key associated with the terminal identifier being delivered by a cloud server after the cloud server obtains, after receiving to-be-authenticated information historically transmitted by a wireless access point device, a verification key matching the to-be-authenticated terminal, and verification performed according to the obtained verification key by the cloud server on verification information included in the historically transmitted to-be-authenticated information succeeds; and a request response module, configured to complete, when the verification key associatively stored with the terminal identifier is found, authentication on the to-be-authenticated terminal according to the verification key, and establish, in response to the wireless local area network connection request, a wireless local area network connection with the to-be-authenticated terminal after the authentication succeeds.

According to an aspect of the embodiments of this application, an electronic device is provided. The electronic device includes a processor and memory. The memory stores computer-readable instructions that, when executed by the processor, implements the wireless local area network authentication method described above.

According to an aspect of the embodiments of this application, a computer system (e.g., a server system) is provided. The computer system includes one or more processors and memory. The memory stores computer-readable instructions that, when executed by the one or more processors, cause the one or more processors to perform any of the methods disclosed herein.

According to an aspect of the embodiments of this application, a non-transitory computer-readable storage medium is provided. The computer-readable storage medium stores computer-readable instructions, which, when executed by a processor of a computer, causing the computer to perform any of the methods disclosed herein.

According to an aspect of the embodiments of this application, a computer program product or a computer program is provided, the computer program product or the computer program including computer instructions, the computer instructions being stored in a computer-readable storage medium. The processor of the computer device reads the computer instructions from the computer-readable storage medium, and the processor executes the computer instructions, to cause the computer device to perform the wireless local area network authentication method provided in the foregoing various embodiments.

DESCRIPTION OF EMBODIMENTS

Figure 1:
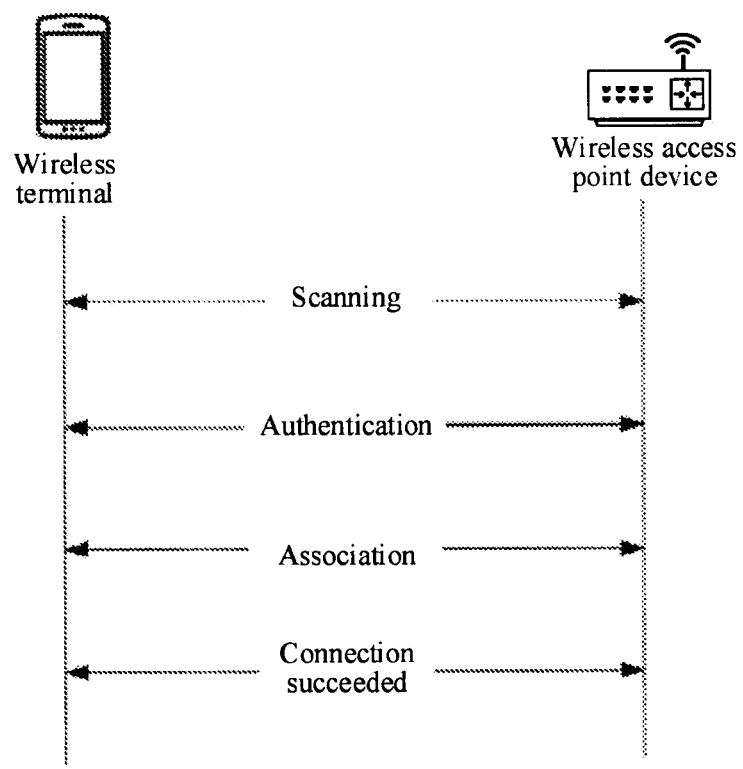
FIG. 1 is a schematic flowchart of a wireless local area network connection according to some embodiments of this application.

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. The implementations described in the following exemplary embodiments do not represent all implementations consistent with this application. On the contrary, the implementations are merely examples of apparatuses and methods that are described in detail in the appended claims and that are consistent with some aspects of this application.

The block diagrams shown in the accompanying drawing are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change according to an actual case.

It should be further noted that "plurality of" mentioned in this application means two or more. "And/or" describes an association relationship for associated objects and represents that three relationships may exist. For example, A and/or B may represent the following three cases: only A exists, both A and B exist, and only B exists. The character "/" generally indicates an "or" relationship between the associated objects.

In the field of wireless communication, a wireless terminal, when using its own wireless local area network (Wi-Fi) function, needs to perform at least scanning, authentication, and association processes between the wireless terminal and a wireless access point device, to enable the wireless terminal to be connected to a wireless local area network. For details, refer to a process in which the wireless terminal accesses to the wireless local area network provided by the wireless access point device shown in FIG. 1.

The scanning process includes active scanning and passive scanning. The active scanning includes: broadcasting, by the wireless terminal, a probe request in each channel; and returning, by the wireless access point device that has received the probe request, a probe response to the wireless terminal. The probe response includes a service set identifier (SSID) of the wireless access point device, so that the wireless terminal can update its own wireless network list. The passive scanning includes: periodically transmitting, by the wireless access point device, a beacon data packet, so that the wireless terminal updates its own wireless network list.

After the scanning is completed, the wireless terminal selects a wireless local area network that it wants to join. At this time, a window for inputting a user password usually pops up in the wireless device, or the window for inputting the user password may not pop up. Afterwards, the wireless terminal and the wireless access point device corresponding to the selected wireless local area network enter an authentication process.

The authentication process usually includes WPA/WPA2-PSK authentication or WPA/WPA2-PPSK authentication. The two authentication processes include an extensible authentication protocol over LAN (EAPOL) four-way handshake process. The two authentication processes are also a wireless authentication process applicable to a scenario such as an enterprise that has a relatively high requirement for network security.

After the authentication succeeds, the wireless terminal and the wireless access point device perform an association process. Specifically, the wireless terminal transmits an association request data packet to the wireless access point device, and the wireless access point device transmits an association response data packet to the wireless terminal.

After the association process is completed, the wireless terminal is successfully connected to the selected wireless local area network.

Compared with the WPA/WPA2-PSK authentication manner, in the WPA/WPA2-PPSK authentication method, an independent pre-shared key (PSK) may be allocated to each user in the wireless local area network, which greatly improves the network security. In addition, as long as the wireless terminal supports the WPA-PSK authentication manner (a wireless network authentication manner mainly for personal or home networks), the wireless terminal does not need to perform an additional processing process when connecting to a wireless network, which is greatly applicable to an enterprise scenario with a large number of employees being connected to the wireless network. Therefore, the WPA/WPA2-PPSK authentication manner may be specifically used in an enterprise wireless local area network system provided in some embodiments of this application. Certainly, in another embodiment, the enterprise wireless local area network system may alternatively use the WPA/WPA2-PSK authentication manner, which is not limited herein.

Figure 2:
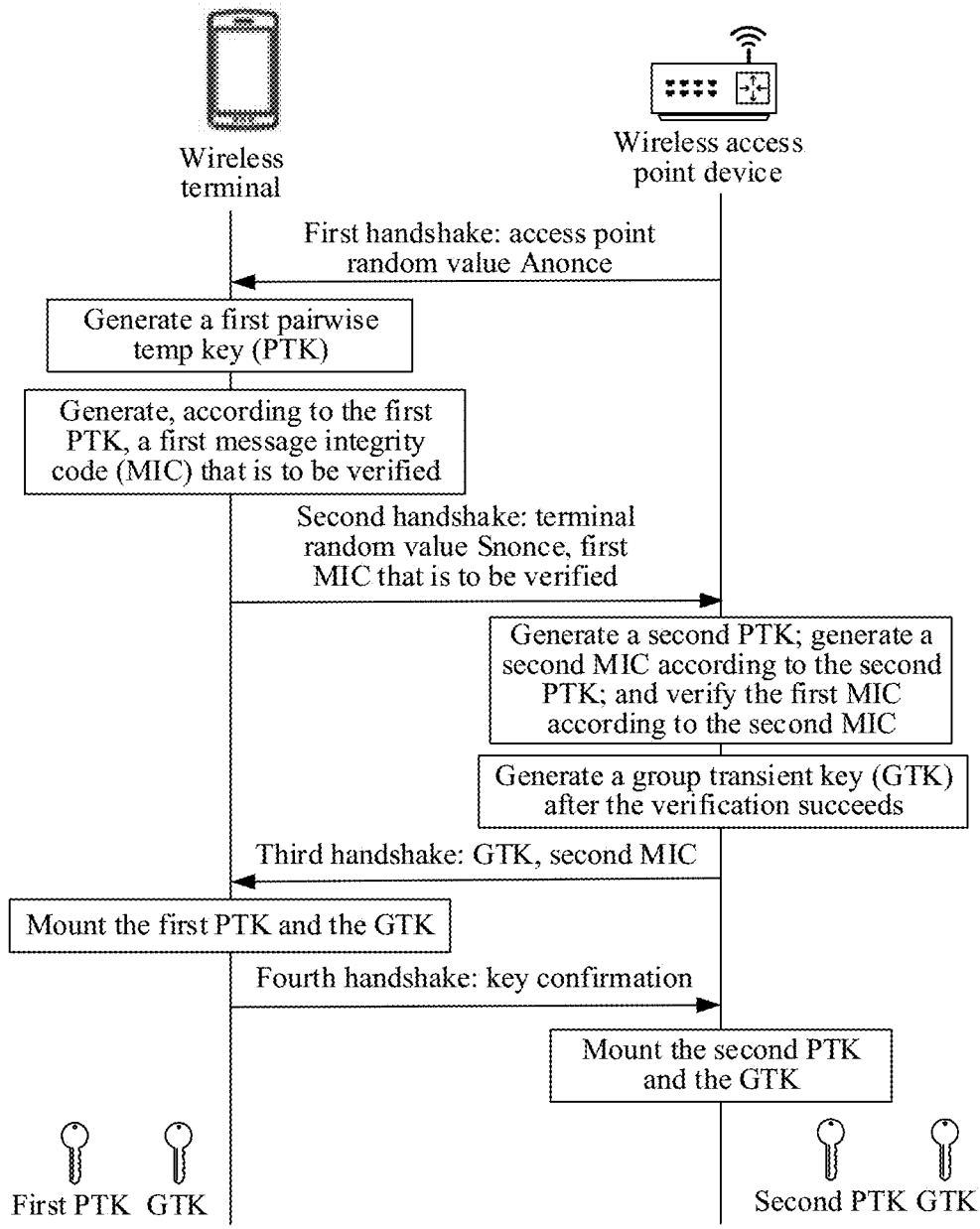
FIG. 2 is a flowchart of a wireless local area network authentication method according to some embodiments of this application.

FIG. 2 is a flowchart of the WPA/WPA2-PPSK authentication manner according to some embodiments of this application. The WPA/WPA2-PPSK authentication includes the four-way handshake process shown in FIG. 2. For a detailed process, reference may be made to the following descriptions.

First handshake: The wireless access point device generates an access point random value ANonce, and transmits the generated access point random value ANonce to the wireless terminal.

Second handshake: The wireless terminal obtains a user input key and generates a terminal random value SNonce.

The wireless terminal generates a first pairwise temp key (PTK) based on one or more of the user input key, the terminal random value SNonce, the access point random value ANonce, and a device identifier of the wireless access point device. The device identifier of the wireless access point device may include one or more of a MAC address, a service set identifier, an extended service set identifier, and a basic service set identifier corresponding to the wireless access point device. The device identifier of the wireless access point device is obtained by the wireless terminal in the scanning process. The first pairwise temp key PTK is calculated and obtained by using a pseudo-random function algorithm, for example, calculated and obtained by using a pseudo-random function (PRF) algorithm. The user input key is usually a personal pre-shared key of a user.

The wireless terminal further generates a first message integrity code (MIC) according to the first pairwise temp key PTK, and uses the terminal random value and the first message integrity code MIC as verification information to be transmitted to the wireless access point device. The first message integrity code MIC is obtained by performing an encryption operation on to-be-transmitted information by using a first key confirmation key (KCK) of the wireless terminal. The first key confirmation key KCK is specific bytes included in the first pairwise temp key PTK, and is usually the first 16 bytes in the first pairwise temp key PTK.

Third handshake: After receiving the verification information transmitted by the wireless terminal, the wireless access point device generates, according to parameter information obtained by itself, a second pairwise temp key PTK by using the same manner in which the first pairwise temp key PTK is generated in the wireless terminal, and correspondingly generates a second message integrity code MIC, and performs verification on the first message integrity code MIC included in the verification information by using the second message integrity code MIC. When the second message integrity code MIC is the same as the first message integrity code MIC, it indicates that the verification succeeds.

It is worth mentioning that the parameter information obtained by the wireless access point device includes a pairwise master key (PMK) corresponding to the wireless terminal. For example, the wireless access point device stores the pre-shared keys allocated to a large number of users. By using the pre-shared key of each user and a service set identifier code of the wireless access point device, the pairwise master key PMK of each user may be calculated and obtained. However, since the wireless access point device cannot identify the user corresponding to the wireless terminal, the wireless access point device cannot directly search the pairwise master key PMK corresponding to the wireless terminal in itself. Based on this, the wireless access point device needs to search for the pairwise master key PMK in itself, then generates the second pairwise temp key PTK by using the found pairwise master key PMK, and correspondingly generates the second message integrity code MIC. When second message integrity code MIC is different from the first message integrity code MIC, it indicates that a user corresponding to the pairwise master key PMK found this time does match the user in the wireless terminal, and the authentication fails. In this case, a next round of pairwise master key PMK lookup and user identity verification need to be performed until the verification succeeds. In some embodiments, there is also a possibility that after all pairwise master keys PMKs are found, identity verification of the user in the wireless terminal still fails.

After the verification performed by the wireless access point device on the verification information transmitted by the wireless terminal succeeds, a group transient key (GTK) is generated. The group transient key may be obtained through calculation based on the wireless access point random value ANonce. The wireless access point device transmits the group transient key GTK and the second message integrity code MIC that are generated by the wireless access point device to the wireless terminal, to complete a third handshake process. It should be noted that, in some embodiments, the wireless access point device further encrypts the group transient key GTK by using a second key encryption key (KEK), to obtain an encrypted group transient key GTK, and transmits, in a process of the third handshake, the encrypted group transient key GTK to the wireless terminal. The second key encryption key is a specific byte included in the second pairwise temp key.

Fourth handshake: After receiving the group transient key GTK and the second message integrity code MIC transmitted by the wireless access point device, the wireless terminal compares the second message integrity code MIC with its own first message integrity code MIC, to determine whether the second message integrity code MIC and the first message integrity code MIC are the same, and when the second message integrity code MIC and the first message integrity code MIC are the same, the first pairwise temp key PTK and the group transient key GTK are mounted. When the wireless terminal receives the encrypted group transient key GTK, the wireless terminal decrypts the encrypted group transient key GTK by using its own first key encryption key, to obtain a decrypted group transient key GTK. A manner in which the wireless terminal compares the second message integrity code MIC with its own first message integrity code MIC to determine whether the second message integrity code MIC and the first message integrity code MIC are the same may be as follows: the wireless terminal decrypts the second message integrity code MIC by using its own first key confirmation key. When decryption succeeds, it is determined that the second message integrity code MIC and the first message integrity code MIC are the same.

After mounting the first pairwise temp key PTK and the group transient key GTK, the wireless terminal transmits key confirmation information to the wireless access point device, thereby completing a fourth handshake process, that is, completing the WPA/WPA2-PPSK authentication process.

After receiving the key confirmation information, the wireless access point device also mounts the second pairwise temp key PTK and the group transient key GTK. It should be noted that, through the foregoing authentication process, it may be determined that the second pairwise temp key PTK and the first pairwise temp key PTK mounted by the wireless terminal are the same.

Since the second pairwise temp key PTK and the first pairwise temp key PTK are both encryption keys used for encrypting unicast data streams, and the group transient key GTK is an encryption key used for encrypting broadcast and multicast data streams, encrypted transmission of the unicast data stream, the broadcast data stream, and the multicast data stream may be performed between the wireless terminal and the wireless access point device, which ensures security of the wireless network.

Considering that performance of the wireless access point device is generally weak, performance pressure of the wireless access point device is relatively large in the foregoing wireless authentication performing process. Taking a wireless access point device that uses a 560 MHz (megahertz) single-core million instructions per second (MIPS, an indicator for measuring a speed of a CPU) CPU as an example, it takes 226 milliseconds (ms) to generate the second pairwise temp key PTK by searching for 1000 pairwise master keys (PMKs) and perform verification on the message integrity code MIC. In the case of concurrent authenticating multiple wireless terminals, it takes a long time for the wireless access point device to respond to the authentication, and the wireless terminal is prone to re-initiating a connection request due to excessively long time consumption. Therefore, the wireless terminal can never complete the WPA/WPA2-PPSK authentication, resulting in a serious problem of network degradation in the enterprise wireless local area network system.

Some solutions are to set up an access controller connected to the wireless access point device. The access controller may be, for example, a Radius server supporting 802.11X authentication (a wireless local area network protocol originated from the 802.11 protocol, which is used for resolving an access authentication problem of a wireless local area network user). In the authentication process, a processing operation originally performed by the wireless access point device is transferred to the access controller for processing, thereby ensuring stability of the enterprise wireless local area network system. However, an extremely high price of the access controller imposes a heavy cost burden on a general enterprise, and a cost problem caused by purchasing the access controller is particularly obvious in a large enterprise.

Figure 3:
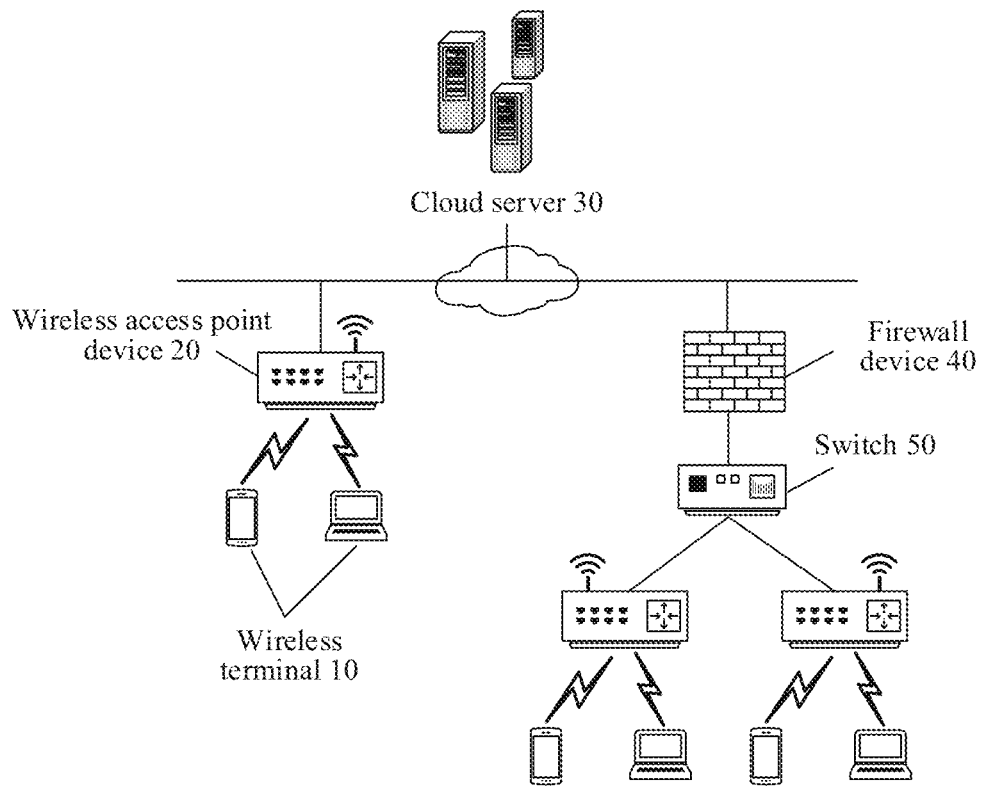
FIG. 3 is an architecture diagram of an enterprise wireless local area network system according to some embodiments of this application.

To resolve the foregoing existing problem, some embodiments of this application provide an enterprise wireless local area network system shown in FIG. 3. As shown in FIG. 3, the exemplary enterprise wireless local area network system includes a wireless terminal 10, a wireless access point device 20, a cloud server 30, a firewall device 40, and a switch 50.

It should be noted that, the enterprise wireless local area network system shown in FIG. 3 is merely an example adapted to this application, and cannot be considered as providing any limitation to a use range of this application. It also cannot be explained that the enterprise wireless local area network system needs to have one or more components of the exemplary enterprise wireless local area network system shown in FIG. 3.

In the enterprise wireless local area network system shown in FIG. 3, the wireless terminal 10 is usually a smart terminal held by an enterprise employee, such as a smart phone, a tablet computer, or a notebook computer. The same employee may hold at least one wireless terminal 10.

The wireless access point device 20 is generally a device for providing a wireless local area network access point (AP), and is also referred to as a wireless switch or a wireless router for a wireless local area network. After the wireless terminal 10 establishes a wireless communication connection with the wireless access point device 20, the employee may access the Internet by using the wireless local area network provided by the wireless access point device 20. To facilitate network management of an enterprise, each wireless access point device 20 may be configured with the same service set identifier.

A wired or wireless communication connection is established between the wireless access point device 20 and the cloud server 30 (e.g., a computer server or a server system). As shown in FIG. 3, the wireless access point device 20 may establish a wireless communication connection with the cloud server 30, or may establish a wired communication connection with the cloud server 30 by sequentially using the switch 50 and the firewall device 40.

Based on the communication connection between the wireless access point device 20 and the cloud server 30, the cloud server 30 can provide a network service to the wireless access point device 20. For example, since performance of the wireless access device 20 is generally weak, when the wireless terminal 10 requests to access the wireless local area network provided by the wireless access point device 20, the cloud server 30 specifically performs a wireless local area network authentication process, to avoid a problem that authentication fails due to relatively weak performance of the wireless access point device 20, and consequently, the wireless terminal 10 cannot be connected to the wireless local area network. Therefore, the enterprise does not need to purchase the high-priced access controller, which greatly reduce costs of the enterprise.

After the authentication performed by the cloud server 30 succeeds, the cloud server 30 further issues information related to the wireless terminal 10 to the wireless access point device 20, and the wireless access point device 20 associatively stores the information delivered by the cloud server 30 and a terminal identifier of the wireless terminal 10. The terminal identifier of the wireless terminal 10 may include a media access control address (MAC, also referred to as a local area network address, a physical address, and the like) of the wireless terminal 10.

When the wireless terminal 10 requests to connect to the wireless local area network provided by the wireless access point device 20 again, the wireless access point device 20 may locally search for, according to the terminal identifier of the wireless terminal 10, information indicating that the cloud server 30 has performed wireless local area network authentication for the wireless access point device 20 in advance, and the authentication succeeds. In this case, the wireless access point device 20 directly establishes a wireless local area network connection to the wireless terminal 10, so that the wireless access point device 20 can quickly respond to a request of the wireless terminal 10 to connect to the wireless local area network.

It should be noted that, the cloud server 30 may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform, which is not limited herein.

Figure 4:
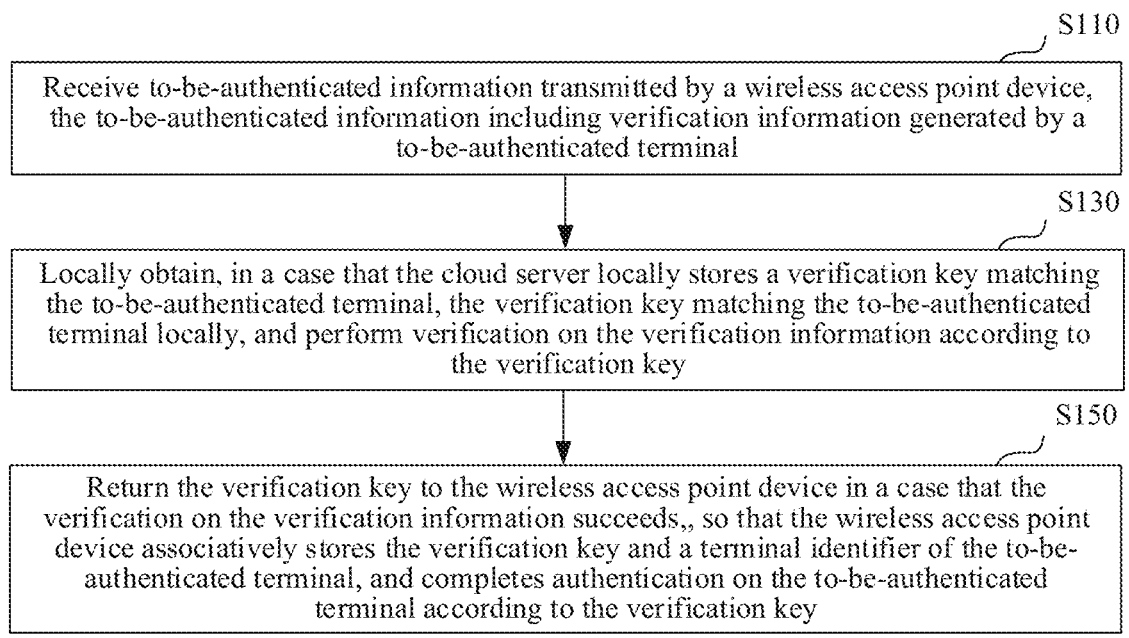
FIG. 4 is a flowchart of a wireless local area network authentication method according to some exemplary embodiments of this application.

FIG. 4 is a flowchart of a wireless local area network authentication method according to an exemplary embodiment of this application. The wireless local area network authentication method may be applied to the enterprise wireless local area network system shown in FIG. 3, and is specifically performed by, for example, the cloud server 30 shown in FIG. 3. In another application scenario, the wireless local area network authentication method may also be specifically performed by another server device, and this is not limited in this embodiment.

As shown in FIG. 4, in some exemplary embodiments, the wireless local area network authentication method includes at least step S110 to step S150. A detailed description is as follows:

Step S110: Receive information to be authenticated (e.g., to-be-authenticated information) transmitted by a wireless access point device, the information to be authenticated including verification information generated by a terminal to be authenticated (e.g., to-be-authenticated terminal).

It should be first noted that, the method provided in this embodiment of this application may be applied to the wireless local area network authentication process shown in FIG. 2. The to-be-authenticated terminal mentioned in this embodiment refers to a wireless terminal to be accessed to a wireless local area network provided by the wireless access point device.

In a process of performing wireless local area network authentication, due to weak performance of the wireless access point device, the wireless access point device transmits the to-be-authenticated information to the cloud server after receiving the verification information transmitted by the to-be-authenticated terminal during the second handshake.

The verification information is generated by the to-be-authenticated terminal, and may include, for example, a terminal random value and a message integrity code that are generated by the to-be-authenticated terminal. In addition to the verification information, the to-be-authenticated information further includes parameter information required by the cloud server when performing verification on the verification information, such as a terminal identifier of the to-be-authenticated terminal, an access point random value generated by the wireless access point device, a device identifier of the wireless access point device, and the like. The terminal identifier of the to-be-authenticated terminal may be a MAC address of the to-be-authenticated terminal, and the device identifier of the wireless access point device may be a MAC address of the wireless access point device.

Therefore, the cloud server receives the to-be-authenticated information transmitted by the access point device.

Step S130: Locally obtain, when the cloud server locally stores a verification key matching the to-be-authenticated terminal, the verification key matching the to-be-authenticated terminal, and perform verification on the verification information according to the verification key.

The verification performed by the cloud server on the verification information is actually verification on the message integrity code included in the verification information. The verification key is a key used for performing verification on the message integrity code included in the verification information. The verification on the verification information can succeed only when the verification key matches the to-be-authenticated terminal.

The message integrity code included in the verification information is generated by the to-be-authenticated terminal according to a user input key, and the user input key may be a key pre-allocated to a user, for example, a pre-shared key allocated to the user. It should be noted that, the key allocated to each user is unique.

A process in which the cloud server performs verification on the message integrity code included in the verification information is based on a process of generating the message integrity code in the to-be-authenticated terminal. A message integrity code is generated in the cloud server, and when the message integrity code generated in the cloud server is consistent with the message integrity code included in the verification information, it indicates that the verification on the verification information succeeds. Therefore, the verification key matching the to-be-authenticated terminal should be consistent with or associated with the user input key, and only in this case, the message integrity code generated by the cloud server can be consistent with the message integrity code included in the verification information, and the verification on the verification information can succeed in the cloud server.

Step S150: Return the verification key to the wireless access point device when the verification on the verification information succeeds, so that the wireless access point device associatively stores the verification key and the terminal identifier of the to-be-authenticated terminal, and completes authentication on the to-be-authenticated terminal according to the verification key.

When the verification on the verification information performed by the cloud server succeeds, the cloud server returns the verification key to the wireless access point device, so that the wireless access point device learns that the cloud server has completed verification on the verification information, and may continue to perform a subsequent authentication process with the to-be-authenticated terminal.

It should be noted that, during the third handshake, the wireless access point device needs to transmit a group transient key and the message integrity code generated when the cloud server performs verification on the verification information to the to-be-authenticated terminal. In this case, after the verification on the verification information succeeds, the cloud server may further transmit information of the group transient key and the message integrity code to the wireless access point device. Alternatively, in some embodiments, after receiving the verification key returned by the cloud server, the wireless access point device may further generate, based on the received verification key, information that needs to be transmitted to the to-be-authenticated terminal during the third handshake.

After receiving the verification key returned by the cloud server, the wireless access point device further associatively stores the verification key with the terminal identifier of the to-be-authenticated terminal. When the same to-be-authenticated terminal is connected to the wireless access point device again, the wireless access point device may locally search for the associatively stored verification key according to the terminal identifier of the to-be-authenticated terminal. In this case, the wireless access point device may determine that the to-be-authenticated terminal has completed the wireless local area network authentication process in advance, and therefore, the wireless access point device may directly perform secure data stream transmission with the to-be-authenticated terminal. Alternatively, the wireless access point device performs, according to the associatively stored verification key that is found, verification on the verification information transmitted by the to-be-authenticated terminal. In this case, the wireless access point device performs verification on the verification information transmitted by the to-be-authenticated terminal only once, which greatly reduces performance pressure of a wireless access point.

Therefore, it can be concluded that, based on the method provided in this embodiment, the wireless access point device deployed in an enterprise wireless local area network system does not need to perform specific verification on the verification information received during the second handshake in the wireless local area network authentication process, but only needs to process a small quantity of data in the wireless local area network authentication process. When a large quantity of wireless devices perform wireless local area network authentication concurrently, the wireless access point device can process data in time, and the wireless terminal does not re-transmit a wireless local area network connection request to the access point device due to authentication timeout, thereby achieving stability of the enterprise wireless local area network system.

In addition, the enterprise does not need to purchase high-price access controllers. Although there are certain costs for the enterprise to acquire an authentication service provided by the cloud server, compared with purchasing access controllers in batches, costs for acquiring a software service is usually much less than that of purchasing a hardware device. Therefore, deployment costs of the enterprise wireless local area network system are greatly reduced based on the method provided on this embodiment.

Moreover, by associatively storing the terminal identifier of the to-be-authenticated terminal with the verification key matching the to-be-authenticated terminal in the wireless access point device, a response of the wireless access point device to a request from the wireless terminal to connect to the wireless local area network is greatly improved. According to the principle of locality, in this embodiment, connection efficiency of the entire enterprise wireless local area network system can also be effectively improved by optimizing a subsequent connection of the wireless terminal that has been connected in the enterprise wireless local area network system.

Figure 5:
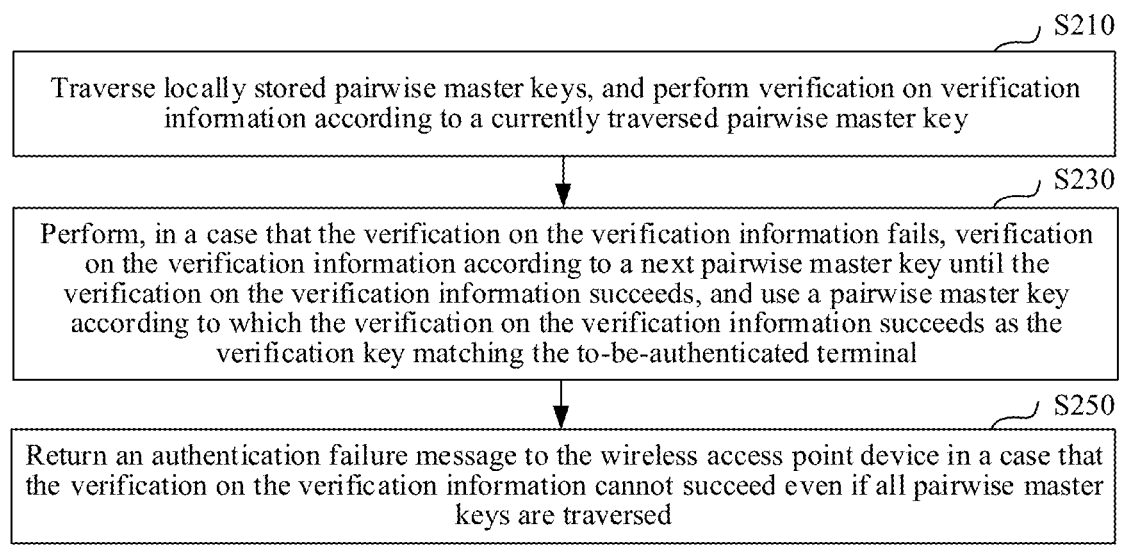
FIG. 5 is an exemplary flowchart of a process of obtaining a verification key matching a terminal to be authenticated, and performing verification on verification information according to the verification key in the embodiments shown in FIG. 4.

In an exemplary embodiment shown in FIG. 5, the verification key matching the to-be-authenticated terminal includes a pairwise master key. The pairwise master key is obtained by the cloud server by performing calculation according to the pre-shared key allocated by the cloud server to the user in the to-be-authenticated terminal and a service set identifier code of the wireless access point.

Exemplarily, a hash-based message authentication code (HMAC) algorithm may be used to export the pre-shared key allocated by the cloud server to the user in the to-be-authenticated terminal and the service set identifier code of the wireless access point device as the pairwise master key matching to the to-be-authenticated terminal. For example, the pre-shared key allocated by the cloud server to the user in the to-be-authenticated terminal may be used as a user password parameter, and the service set identifier code of the wireless access point device is used as a salt parameter. A key is exported according to the negotiated HMAC algorithm, and this operation is cyclically performed 4096 times. A finally obtained key with a length of 32 bytes is used as the pairwise master key matching the to-be-authenticated terminal.

The cloud server may configure initialization information of the enterprise wireless local area network system according to recorded information of employees and branches of the enterprise. The cloud server regards each employee as a user in the wireless local area network, and generates a unique pre-shared key for each user. The cloud server further allocates a service set identifier code to the enterprise, and synchronizes the service set identifier code to the wireless access point devices deployed in the branches of the enterprise, so that all wireless access point devices deployed in the enterprise have the same service set identifier code, thereby facilitating network management of the enterprise.

According to the pre-shared key corresponding to each user and the service set identifier code corresponding to the enterprise, the cloud server may obtain, by calculation, the pairwise master key of each user. Therefore, in some embodiments, after completing the configuration of the initialization information, the cloud server may calculate the pairwise master key of each user, and associatively store the calculated pairwise master key with corresponding user information. The user information may include a mobile phone number of the user, a WeChat identification of the user, and the like. When performing wireless local area network authentication processing, the cloud server may directly obtain the locally stored pairwise master key without performing real-time calculation of the pairwise master key according to the pre-shared key and the service set identifier, thereby reducing the performance pressure of the cloud server in the process of performing the wireless local area network authentication, and improving the connection efficiency of the entire enterprise wireless local area network system to some extent.

In some circumstances, the cloud server cannot determine the user information of the user in the to-be-authenticated terminal, and therefore cannot directly locally find a pairwise master key or a pre-shared key matching the user in the to-be-authenticated terminal. As a result, the verification information cannot be verified directly. To resolve this problem, the embodiment shown in FIG. 5 provides a solution in which the verification information is verified according to the pairwise master keys corresponding to a large quantity of users locally stored in the cloud server. It should be noted that, when the cloud server does not pre-calculate and pre-store the pairwise master key corresponding to each user, during verification of the verification information, it is only necessary to add a step of calculating the pairwise master key according to the pre-shared key and the service set identifier code.

As shown in FIG. 5, in some exemplary embodiments, when the cloud server does not locally associatively store the verification key matching the to-be-authenticated terminal, a process in which the verification key matching the to-be-authenticated terminal is obtained by traversing the locally stored verification key, and the verification information is verified according to the verification key may include steps S210 to S250. A detailed description is as follows:

Step S210: Traverse locally stored pairwise master keys, and perform verification on the verification information according to a currently traversed pairwise master key.

It should be first noted that a traversing process involved in the embodiments means that a stored pairwise master key is locally found in each round, and then verification on the verification information is performed according to the traversed pairwise master key. When the verification fails, a next pairwise master key is traversed to perform verification on the verification information.

The verification information is generated by the to-be-authenticated terminal based on a user input key. Specifically, a message integrity code included in the verification information is generated by the to-be-authenticated terminal based on the user input key. A process of generating the message integrity code in the to-be-authenticated terminal is usually as follows:

generating a pairwise master key according to the user input key and a service set identifier code of the wireless access point device; generating a pairwise temp key according to one or more of the generated pairwise master key, a terminal random value and a terminal identifier of the to-be-authenticated terminal, and an access point random value and a device identifier of the wireless access point device; obtaining a key confirmation key from the pairwise temp key; and obtaining the message integrity code by encrypting to-be-transmitted information by using the key confirmation key. The to-be-transmitted information at least includes the terminal random value generated by the to-be-authenticated terminal.

A process of generating the message integrity code in the cloud server is similar to the process of generating the message integrity code in the to-be-authenticated terminal, but the two processes are somewhat different, specifically as follows:

The pairwise temp key is calculated according to the currently traversed pairwise master key. The cloud server obtains, from the to-be-authenticated information transmitted by the wireless access point device, at least one piece of the following information related to the user input key: the terminal random value generated by the to-be-authenticated terminal, the terminal identifier of the to-be-authenticated terminal, the access point random value generated by the wireless access point device, and the device identifier of the wireless access point device, and performs a pseudo-random function operation according to the traversed pairwise master key and the information related to the user input key, to obtain the pairwise temp key.

The message integrity code is generated according to the calculated pairwise temp key. The cloud server obtains the key confirmation key according to the pairwise temp key, and performs, according to the key confirmation key, an encryption operation on a message transmitted by the to-be-authenticated terminal, to obtain the message integrity code. The key confirmation key is a specified sequence included in the pairwise temp key, and the message transmitted by the to-be-authenticated terminal includes the terminal random value generated by the to-be-authenticated terminal.

When the message integrity code generated by the cloud server is consistent with the message integrity code included in the verification information, it indicates that the user input key is a legal key allocated by the cloud server to the user in advance. In this case, the verification performed by the cloud server on the verification information succeeds.

Step S230: Perform, when the verification on the verification information fails, verification on the verification information according to a next pairwise master key until the verification on the verification information succeeds, and use a pairwise master key according to which the verification on the verification information succeeds as the verification key matching the to-be-authenticated terminal.

When the user input key is a pre-shared key allocated by the cloud server to an authorized user, the cloud server can locally find a pairwise master key according to which the verification on the verification information succeeds, and the pairwise master key is used as the verification key matching the to-be-authenticated terminal. The user input key is usually a key input by a user when the user uses a Wi-Fi function of the to-be-authenticated terminal.

Step S250: Return an authentication failure message to the wireless access point device when the verification on the verification information cannot succeed even if all pairwise master keys are traversed.

When the verification on the verification information cannot succeed even if all pairwise master keys are traversed, it indicates that the user input key is not the pre-shared key allocated by the cloud server to the authorized user, that is, the user in the to-be-authenticated terminal is not the authorized user, and the cloud server needs to return the authentication failure message to the wireless access point. When the to-be-authenticated terminal fails to complete the wireless local area network authentication, the to-be-authenticated terminal cannot establish a connection with the wireless local area network, thereby achieving the security of the enterprise wireless local area network.

It should be noted that, considering a case in which a person is added in or leaves the enterprise at any time, after completing the configuration of the initialization information, the cloud server supports a modification of the initialization information, usually including a modification of the pre-shared key of the user, thereby adapting to an actual requirement of the enterprise on the wireless local area network.

In the exemplary embodiment shown in FIG. 5, after the verification performed by the cloud server on the verification information succeeds, the cloud server further associatively stores the verification key matching the to-be-authenticated terminal with the terminal identifier of the to-be-authenticated terminal, to form, in the cloud server, information storage for the verification key of the wireless terminal that has been connected to the enterprise wireless local area network, and the terminal identifier. The verification key matching the to-be-authenticated terminal is, for example, the pairwise master key according to which the verification on the verification information succeeds.

Figure 6:
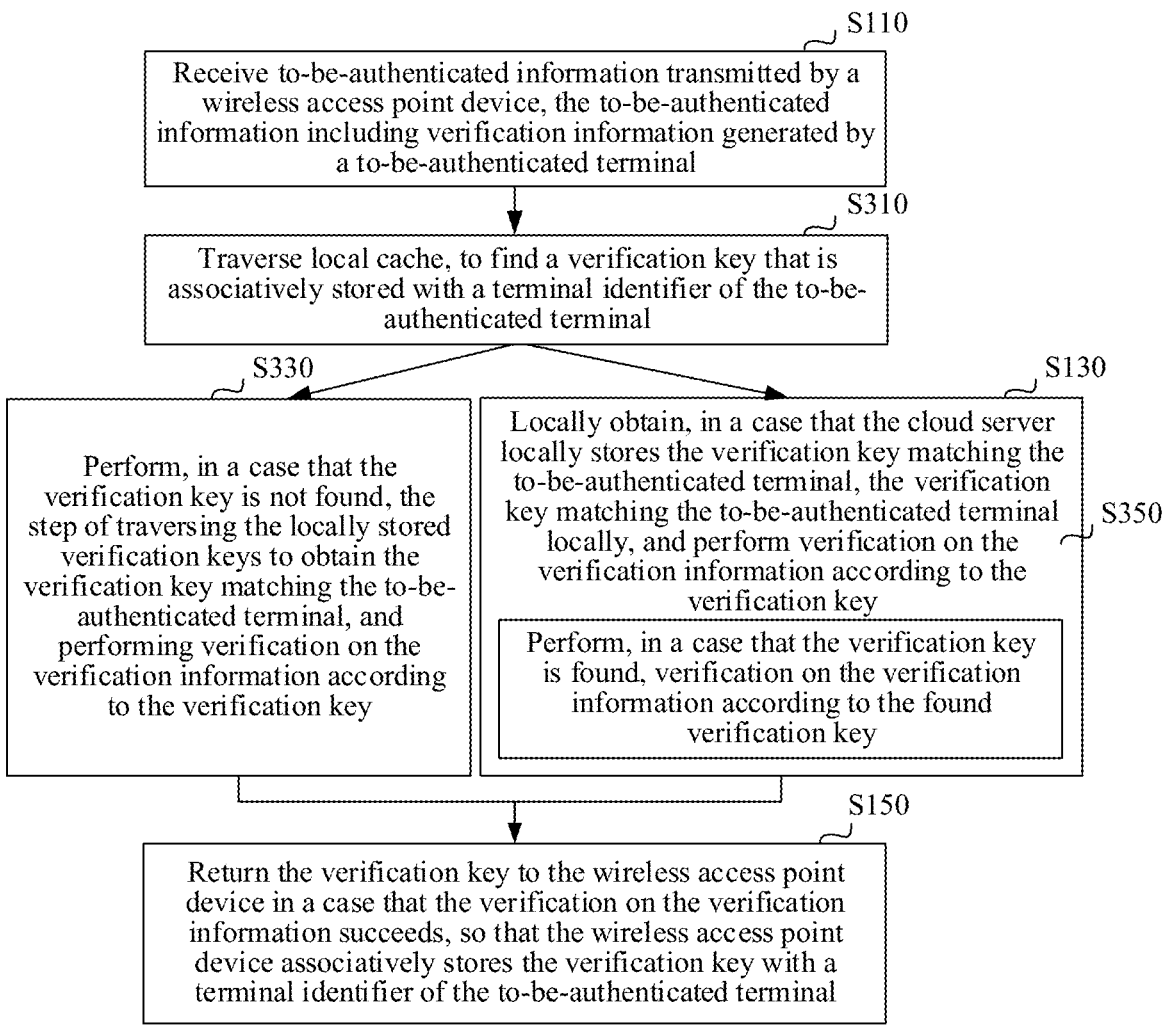
FIG. 6 is a flowchart of a wireless local area network authentication method according to some embodiments of this application.

Before obtaining the verification key matching the to-be-authenticated terminal in step S130 and performing verification on the verification information according to the verification key, the cloud server further performs step S310 shown in FIG. 6. A detailed description is as follows:

Step S310. Traverse local cache, to find a verification key that is associatively stored with the terminal identifier of the to-be-authenticated terminal.

In this embodiment, it may be determined that the to-be-authenticated terminal has been connected to the enterprise wireless local area network when the verification key that is associatively stored with the terminal identifier of the to-be-authenticated terminal is locally found, and therefore security of the enterprise wireless local area network can be ensured without performing wireless local area network authentication. In this case, content of step S350 is performed.

It indicates that the to-be-authenticated terminal requests to connect to the enterprise wireless local area network for the first time when the verification key that is associatively stored with the terminal identifier of the to-be-authenticated terminal is not locally found, and therefore the wireless local area network authentication needs to be performed to ensure the security of the enterprise wireless local area network. In this case, content of step S330 is performed.

Step S330: Perform, when the verification key is not found, the step of traversing the locally stored verification keys to obtain the verification key matching the to-be-authenticated terminal, and performing, verification on the verification information according to the verification key.

A detailed process in which the cloud server traverses the locally stored verification keys to obtain the verification key matching the to-be-authenticated terminal, and performs verification on the verification information according to the verification key may refer to step S210 in the embodiment shown in FIG. 5, and details are not described herein.

Step S350: Perform, when the verification key is found, verification on the verification information according to the found verification key.

When the cloud server finds the verification key, the cloud server returns the verification key to the wireless access point device, so that the verification key of the wireless access point device is associatively stored with the terminal identifier of the to-be-authenticated terminal. For a detailed process, reference may be made to step S150 in the embodiment shown in FIG. 4, and details are not described herein.

Therefore, in the method provided in this embodiment, before obtaining the verification key matching the to-be-authenticated terminal and performing verification on the verification information according to the verification key, the cloud server locally searches for the verification key associatively stored with the terminal identifier of the to-be-authenticated terminal in advance. When the to-be-authenticated terminal is determined to have been connected to the enterprise wireless local area network, there is no need to perform the wireless local area network authentication process for the to-be-authenticated terminal repeatedly, thereby greatly reducing the performance pressure of the cloud server, and also greatly improving the connection efficiency of the entire enterprise wireless local area network system.

Figure 7:
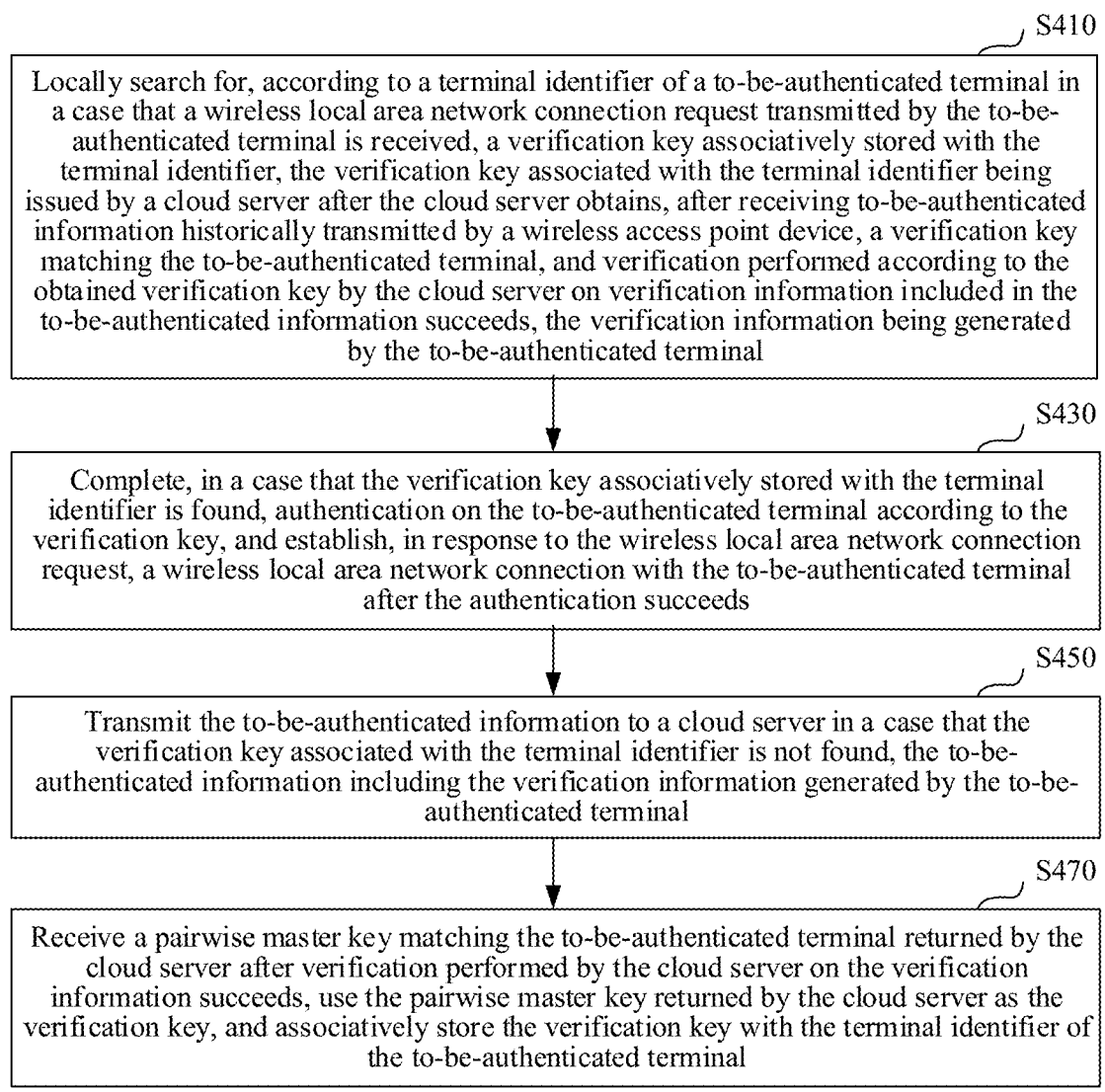
FIG. 7 is a flowchart of a wireless local area network authentication method according to some embodiments of this application.

FIG. 7 is a flowchart of a wireless local area network authentication method according to some embodiments of this application. The wireless local area network authentication method may further be applied to the enterprise wireless local area network system shown in FIG. 3, and is specifically performed by, for example, the wireless access point device 20 shown in FIG. 3. In another application scenario, the wireless local area network authentication method may also be specifically performed by another wireless access point device, and this is not limited in this embodiment.

As shown in FIG. 7, in an exemplary embodiment, the wireless local area network authentication method includes at least step S410 to step S470. A detailed description is as follows:

Step S410: Locally search for, according to a terminal identifier of a to-be-authenticated terminal when a wireless local area network connection request transmitted by the to-be-authenticated terminal is received, a verification key associatively stored with the terminal identifier, the verification key associated with the terminal identifier being issued by a cloud server after the cloud server obtains, after receiving to-be-authenticated information historically transmitted by a wireless access point device, a verification key matching the to-be-authenticated terminal, and verification performed according to the obtained verification key by the cloud server on verification information included in the to-be-authenticated information succeeds, the verification information being generated by the to-be-authenticated terminal.

The wireless local area network connection request transmitted by the to-be-authenticated terminal to the wireless access point device may be initiated by the to-be-authenticated terminal to a wireless access point device corresponding to a selected wireless access point device after the to-be-authenticated terminal selects, after performing the scanning process shown in FIG. 1, the to-be-added wireless local area network from a wireless local area network list updated by itself.

The terminal identifier of the to-be-authenticated terminal may be carried in the wireless local area network connection request transmitted by the to-be-authenticated terminal, or during performing of the scanning process shown in FIG. 1, the wireless access point device may also obtain the terminal identifier of the to-be-authenticated terminal. The terminal identifier of the to-be-authenticated terminal may be a MAC address of the to-be-authenticated terminal.

As described in the embodiment shown in FIG. 4, due to the weak performance of the wireless access point device, the wireless access point, after obtaining the verification information transmitted by the to-be-authenticated terminal during the second handshake, transmits the to-be-authenticated information to the cloud server, and carries the verification information transmitted by the to-be-authenticated terminal in the to-be-authenticated information, to enable the cloud server to perform verification on the verification information. The verification information is generated by the to-be-authenticated terminal, and a message integrity code included in the verification information is generated by the to-be-authenticated terminal based on a user input key. After the cloud server finds a verification key stored in itself, and the verification performed by the cloud server on the verification information according to the verification key succeeds, the cloud server returns the verification key to the wireless access point device, so that the wireless access point device associatively stores the verification key with the terminal identifier of the to-be-authenticated terminal.

Therefore, the wireless access point device stores information related to the to-be-authenticated terminal that has been connected to an enterprise wireless local area network. After receiving the wireless local area network connection request transmitted by the to-be-authenticated terminal, the wireless access point device first locally searches for a verification key associated with the terminal identifier according to the terminal identifier of the to-be-authenticated terminal. When the verification key is found, it indicates that the to-be-authenticated terminal that initiates the wireless local area network connection request has been connected to the enterprise wireless local area network. In this case, content of step S430 may be performed.

When the verification key is not found, it indicates that the to-be-authenticated terminal that initiates the wireless local area network connection request requests to establish a wireless local area network connection with the wireless access point device for the first time, and a wireless local area network authentication process needs to be performed. In this case, content described in step S450 to step S470 is performed.

Step S430: Complete, when the verification key associatively stored with the terminal identifier is found, authentication on the to-be-authenticated terminal according to the verification key, and establish, in response to the wireless local area network connection request, a wireless local area network connection with the to-be-authenticated terminal after the authentication succeeds.

Since the to-be-authenticated terminal and the wireless access point device, during performing of the wireless local area network authentication for the first time, are both provided with pairwise temp keys used for encrypting unicast data streams and group transient keys used for encrypting broadcast and multicast data streams, the wireless access point device may perform encrypted data stream transmission with the to-be-authenticated terminal after establishing, in response to the wireless local area network connection request, the wireless local area network connection with the to-be-authenticated terminal.

Step S450: Transmit the to-be-authenticated information to a cloud server when the verification key associatively stored with the terminal identifier is not found, the to-be-authenticated information including the verification information generated by the to-be-authenticated terminal.

Step S470: Receive a pairwise master key matching the to-be-authenticated terminal returned by the cloud server after verification performed by the cloud server side on the verification information succeeds, use the pairwise master key returned by the cloud server side as the verification key, and associatively store the verification key with the terminal identifier of the to-be-authenticated terminal.

It should be noted that, for detailed processes of step S450 and step S470, refer to the content described in the embodiment shown in FIG. 4, and details are nor described herein again.

It can be seen from the above that, according to the method provided in this embodiment, any wireless access point device deployed in the enterprise wireless local area network system does not need to perform verification on the verification information generated by the to-be-authenticated terminal, but transfers the process of performing verification on the verification information generated by the to-be-authenticated terminal to a cloud side. Therefore, the enterprise does not need to purchase a high-priced access controller, which can effectively resolve the problem existed in the related technology.

This application is further set as follows: The wireless access point device stores the information related to the to-be-authenticated terminal that has been connected to the enterprise wireless local area network. When the wireless access point device receives the wireless local area network connection request transmitted by the to-be-authenticated terminal, the wireless access point device preferentially determines whether the to-be-authenticated terminal initiating the request is the to-be-authenticated terminal that has been connected to the enterprise wireless local area network, and when the to-be-authenticated terminal initiating the request is the to-be-authenticated terminal that has been connected to the enterprise wireless local area network, the wireless access point device directly establishes a wireless local area network connection with the to-be-authenticated terminal. This technical means greatly reduces the performance pressure of the cloud server, and enables the wireless terminal to be connected to the wireless access point device quickly, thereby greatly improving the connection efficiency of the entire enterprise wireless local area network system.

In addition, in this embodiment, the wireless access point device only stores the information of the wireless terminal that has been connected to the wireless local area network, and does not synchronously store all wireless terminals that have been connected in the enterprise, which can reduce data redundancy in the wireless access point and a time consumed by the wireless access point device for searching for and obtaining the verification key associated with the terminal identifier of the wireless terminal, thereby reducing the performance pressure of the wireless access point device, and improving a connection rate between the wireless terminal and the wireless access point device.

It is also to be noted that, in some other embodiments, for example, when performance of the wireless access point device is relatively good, the wireless access point device may store all wireless terminals that have been connected in the enterprise, and this is not limited herein.

Figure 8:
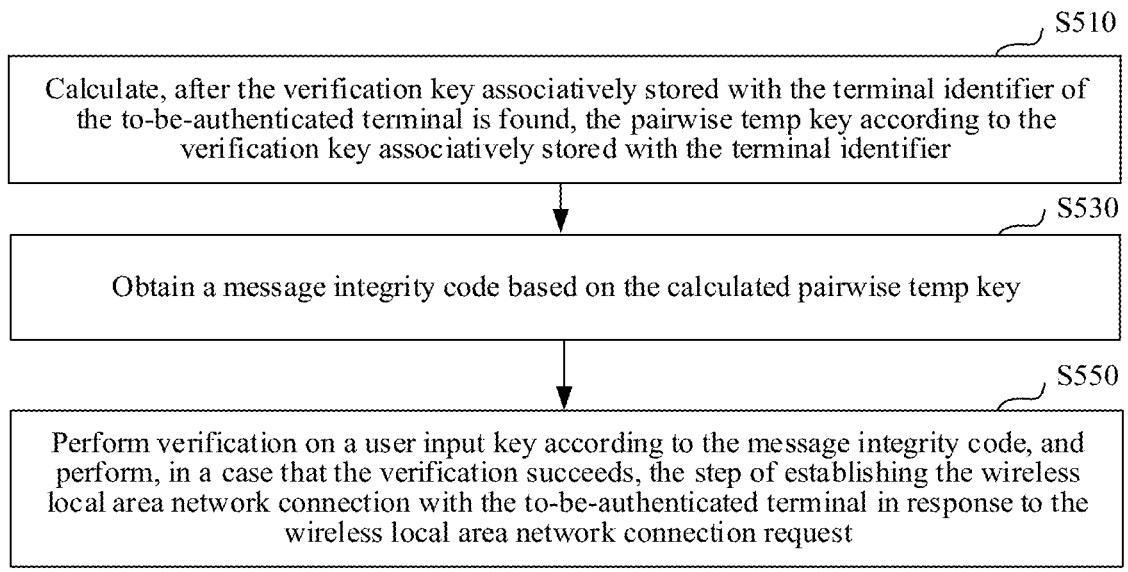
FIG. 8 is a flowchart of a wireless local area network authentication method according to some embodiments of this application.

In an exemplary embodiment shown in FIG. 8, the wireless access point device further implements step S510 to step S550. A detailed description is as follows:

Step S510: Calculate, after the verification key associatively stored with the terminal identifier of the to-be-authenticated terminal is found, the pairwise temp key according to the verification key associatively stored with the terminal identifier.

In this embodiment, the wireless local area network authentication process still needs to be performed between the to-be-authenticated terminal and the wireless access point device. After finding the verification key associated with the terminal identifier of the to-be-authenticated terminal, the wireless access point device locally performs, according to the found verification key, verification on the verification information transmitted by the to-be-authenticated terminal.

In this case, the wireless access point device needs to calculate the pairwise temp key according to the found verification key. For a detailed calculation process, refer to the process in which the cloud server generates the pairwise temp key described in the foregoing embodiment, and details are not described herein again.

Step S530: Obtain a message integrity code based on the calculated pairwise temp key.

After obtaining the pairwise temp key by calculation, the wireless access point device further needs to generate the message integrity code, to perform verification on the message integrity code included in the verification information according to the message integrity code generated by itself, thereby implementing verification on the verification information. For a detailed calculation process, still refer to the process in which the cloud server generates the message integrity code described in the foregoing embodiment, and details are not described herein again.

Step S550: Perform verification on the user input key according to the message integrity code, and perform, when the verification succeeds, the step of establishing the wireless local area network connection with the to-be-authenticated terminal in response to the wireless local area network connection request.

Since the message integrity code included in the verification information is generated by the to-be-authenticated terminal according to the user input key, the wireless access point device compares the message integrity code generated by itself with the message integrity code included in the verification information after generating the message integrity code. When the two message integrity codes are consistent, it indicates that the user input key is a pre-shared key inputted for an authorized user, and the verification on the verification information succeeds.

After the verification on the verification information succeeds, the wireless access point device may perform a subsequent wireless local area network connection process with the to-be-authenticated terminal, and establishes a wireless local area network connection with the to-be-authenticated terminal.

It can be seen that, in the method provided in this embodiment, a complete wireless local area network authentication process, that is, the four-way handshake process shown in FIG. 2, is performed between the wireless access point device and the wireless terminal. The wireless access point device performs, according to the associatively stored verification key that is found, verification on the verification information transmitted by the to-be-authenticated terminal. In this case, the wireless access point device performs verification on the verification information transmitted by the to-be-authenticated terminal only once. Compared with an existing technical implementation solution in which the wireless access point device needs to search for and perform the process of verifying the verification information for many times, the solution in this embodiment also greatly reduces the performance pressure of the wireless access point, and can ensure the stability and security of the enterprise wireless local area network.

Figure 9:
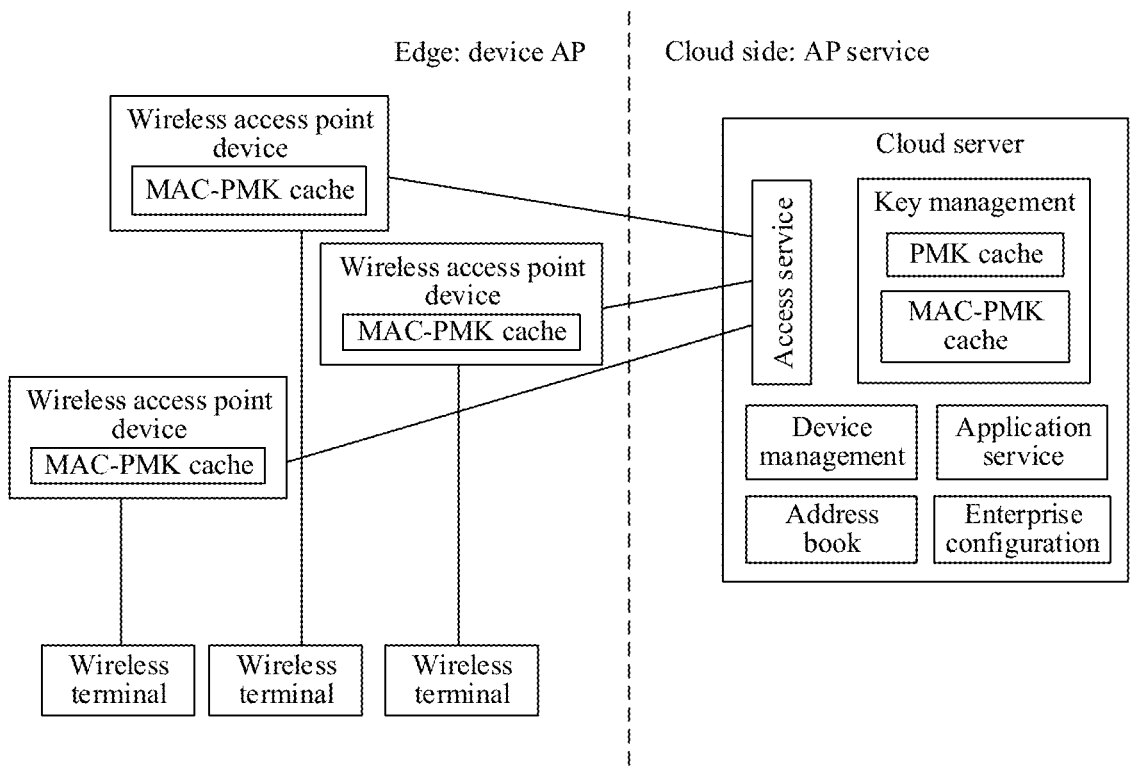
FIG. 9 is an architecture diagram of an enterprise wireless local area network system according to embodiments of this application.

Based on the foregoing embodiments, an architecture of an enterprise wireless local area network system shown in FIG. 9 may be obtained.

As shown in FIG. 9, the architecture of the enterprise wireless local area network system may be divided into an edge side and a cloud side. The edge side includes a plurality of wireless access point devices, which is configured to provide a MAC to an enterprise core network. The cloud side provides wireless access services for the wireless access point devices of the edge side by a cloud server.

The cloud server includes one or of an access service module, a key management module, a device management module, an application service module, an address book module, and an enterprise configuration module. The access service module is configured to connect to the wireless access point device and maintain related heartbeats. The device management module is configured to manage information related to a connected wireless access point device, for example, information such as an enterprise to which the wireless access point device belongs. The enterprise configuration module is configured to manage wireless access point configuration information related to each enterprise, for example, service set identifier codes of different enterprises are different. The address book module is configured to record information of an enterprise employee, such as a mobile phone number or a WeChat identification. The application service module is configured to provide information related to an application programming interface (API) to the outside.

It is worth mentioning that the key management module is configured to generate, delete and update key information. For example, when an employee is added to an enterprise, a unique pre-shared key needs to be allocated to the new employee, and when an employee leaves the enterprise, information related to the employee needs to be deleted correspondingly. The key management module is further configured for pairwise master key cache (that is, PMK cache shown in FIG. 9), and associative cache (that is, MAC-PMK cache shown in FIG. 9) of a terminal identifier of a wireless terminal and a pairwise master key. The PMK cache means that the cloud server generates a pairwise master key for each employee according to the pre-shared key of each employee in the enterprise and the service set identifier code corresponding to the enterprise, and locally stores the pairwise master key of each employee. The MAC-PMK cache means that the pairwise master key according to which the verification performed on the verification information generated by the wireless terminal succeeds is locally associatively stored with the terminal identifier of the wireless terminal.

The wireless access point devices of the edge side are connected to the cloud server, and receive access point information configured by the cloud server for the wireless access point devices, for example, the service set identifier code. Wireless access point devices belonging to the same enterprise may have the same service set identifier code, and receive key delivery and management of the cloud server, and connection information of the wireless terminal. The wireless access point device also locally performs the MAC-PMK cache.

In the architecture of the enterprise wireless local area network system shown in FIG. 9, a multi-level key cache mechanism is provided, specifically as follows:
1. The wireless access point device performs the MAC-PMK cache, so that the wireless access point device can locally implement rapid wireless local area network authentication;
2. The cloud side performs the MAC-PMK cache, so that the cloud side can implement the rapid wireless local area network authentication; and
3. The cloud side performs the PMK cache, so that the cloud side can implement the rapid wireless local area network authentication.

It should be noted that, for a detailed implementation process of the foregoing multi-level key cache mechanism, refer to the content described in the embodiments shown in FIG. 4 to FIG. 8, and details are nor described herein again. By setting the foregoing multi-level key cache mechanism, the enterprise wireless local area network can easily meet requirements of wireless local area network connections of a large quantity of employees. The multi-level key cache mechanism can be applied to an enterprise with more than 1,000 people. In addition, in actual application, at least one key cache mechanism may be selected according to an actual situation, which is not limited herein.

Figure 10:
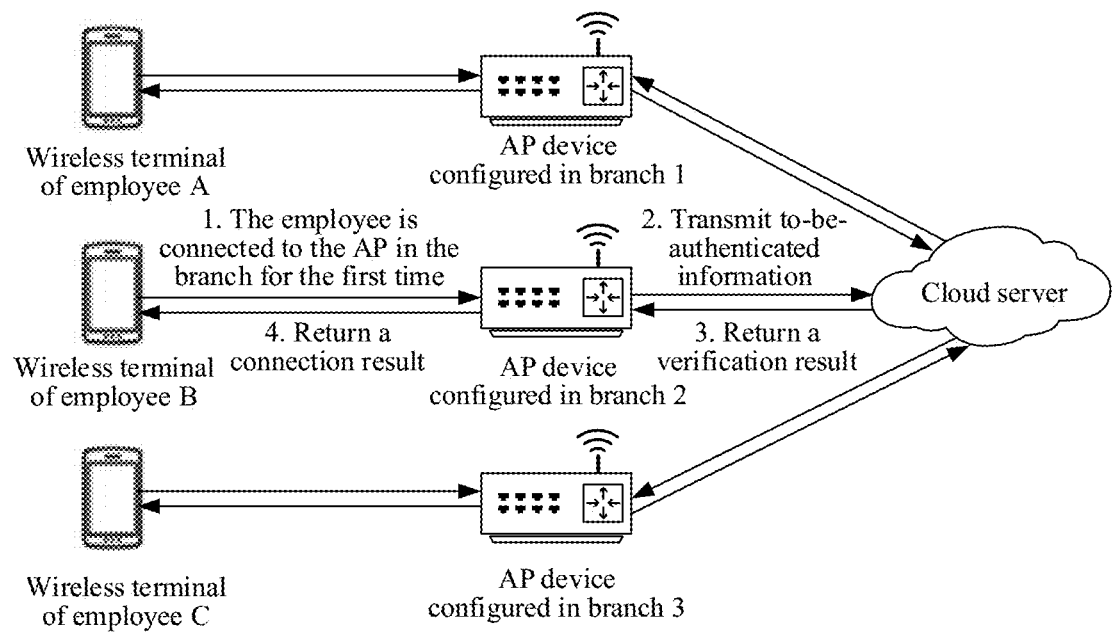
FIG. 10 is a schematic diagram of an exemplary application scenario according to some embodiments of this application.
Figure 11:
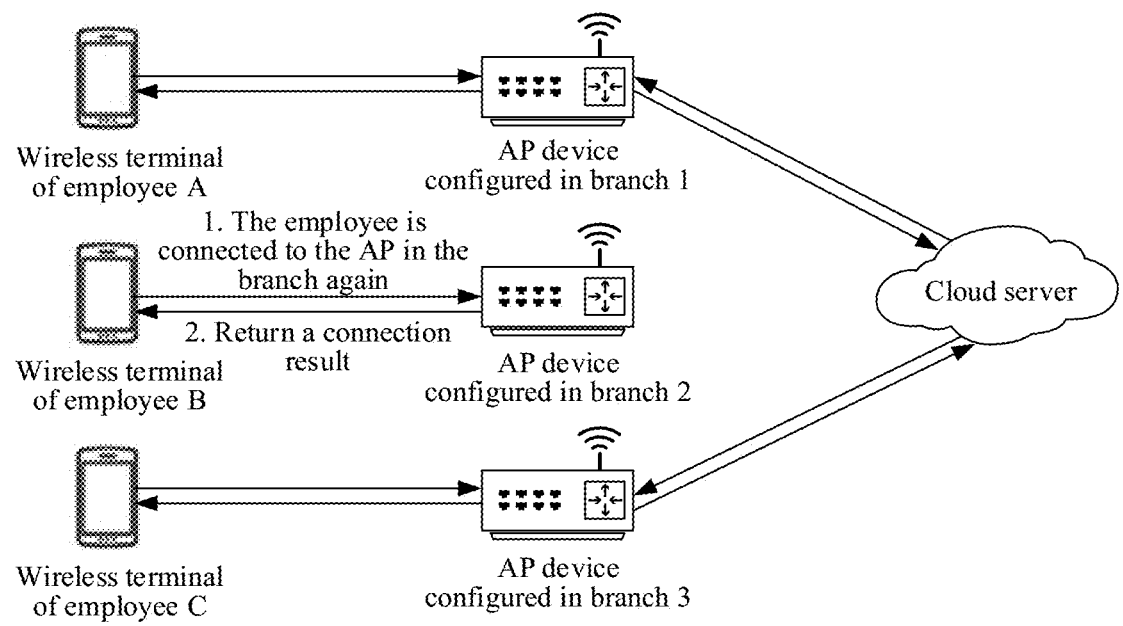
FIG. 11 is a schematic diagram of an exemplary application scenario according to some other embodiments of this application.
Figure 12:
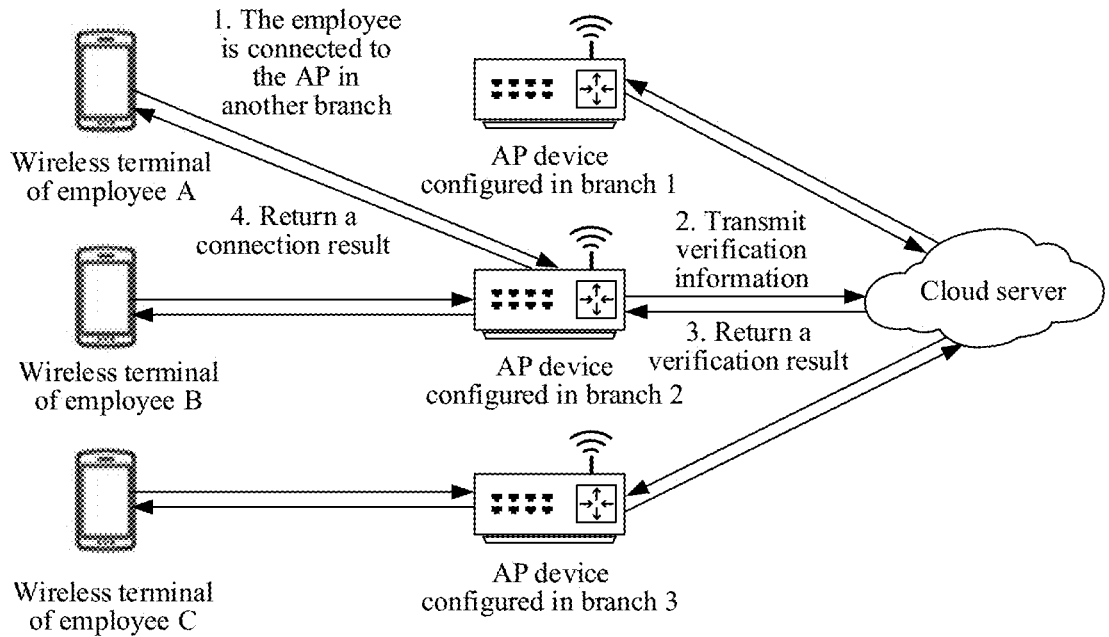
FIG. 12 is a schematic diagram of an exemplary application scenario according to some other embodiments of this application.

FIG. 10 to FIG. 12 are schematic diagrams of three exemplary application scenarios according to an embodiment of this application, to facilitate understanding of application of the wireless local area network authentication method provided by this application in an enterprise wireless local area network system, thereby facilitating understanding of the technical solution of this application.

In the exemplary application scenario shown in FIG. 10, an employee B uses a wireless terminal to connect to an AP device (that is, a wireless access point device) of a branch 2 of an enterprise for the first time, and the AP device of the branch 2 transmits to-be-authenticated information to a cloud server, so that the cloud server performs verification on verification information included in the to-be-authenticated information, the verification information being generated by the wireless terminal of the employee B according to a user input key. The cloud server needs to return a verification result to the AP device of the branch 2. When the verification succeeds, the cloud server returns a pairwise master key according to which the verification performed on the verification information succeeds, and when the verification fails, the cloud server returns a verification failure message. The AP device of the branch 2 locally caches MAC-PMK information according to the pairwise master key issued by the cloud server and a MAC address of the wireless terminal of the employee B, and returns a connection result to the wireless terminal of the employee B according to the verification result returned by the cloud server.

In addition, an employee A uses a wireless terminal to connect to an AP device of a branch 1 of the enterprise for the first time, and an employee C uses a wireless terminal to connect to an AP device of a branch 3 of the enterprise for the first time. Detailed processes are the same as the process in which the employee B uses the wireless terminal to connect to the branch 2 of the enterprise for the first time.

In the exemplary application scenario shown in FIG. 11, the employee B uses the wireless terminal to connect to the AP device of the branch 2 of the enterprise again. Since the AP device of the branch 2 stores MAC-PMK information corresponding to the wireless terminal of the employee B, the AP device of the branch 2 can directly establish a connection with the wireless terminal of the employee B, or perform verification on verification information transmitted by the wireless terminal of the employee B by using the pairwise master key PMK, and establish a connection with the wireless terminal of the employee B after the verification succeeds.

In the exemplary application scenario shown in FIG. 12, the employee A uses the wireless terminal to connect to the AP device of the branch 2 of the enterprise for the first time. Since the AP device of the branch 2 does not store MAC-PMK information corresponding to the wireless terminal, verification information transmitted by the wireless terminal of the employee A needs to be verified by using the cloud server.

It can be learned from above that, in the technical solution provided in this application, an edge AP device of an enterprise cooperates with a cloud side AP service, and a multi-level key cache mechanism is set, to achieve a high-efficiency connection and management of an enterprise wireless local area network, so that a large quantity of wireless local area network connection requirements in an enterprise can be greatly satisfied, and wireless local area network connection requirements of branches in the enterprise can also be fully satisfied.

Figure 13:
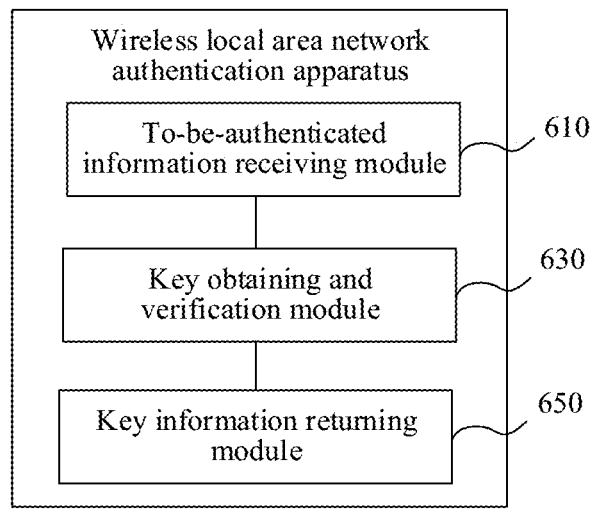
FIG. 13 is a block diagram of a wireless local area network authentication apparatus according to some embodiments of this application.

FIG. 13 is a block diagram of a wireless local area network authentication apparatus according to an embodiment of this application. As shown in FIG. 13, the apparatus may be applied to a cloud server, and includes:

a to-be-authenticated information receiving module 610, configured to receive to-be-authenticated information transmitted by a wireless access point device, the to-be-authenticated information including verification information generated by a to-be-authenticated terminal, the to-be-authenticated terminal being a wireless terminal to be accessed to a wireless local area network provided by the wireless access point device;

a key obtaining and verification module 630, configured to locally obtain, when a verification key matching the to-be-authenticated terminal is stored locally, the verification key matching the to-be-authenticated terminal, and perform verification on the verification information according to the verification key; and a key information returning module 650, configured to return the verification key to the wireless access point device when the verification on the verification information succeeds, so that the wireless access point device associatively stores the verification key and a terminal identifier of the to-be-authenticated terminal, and completes authentication on the to-be-authenticated terminal according to the verification key.

In some other exemplary embodiments, the to-be-authenticated information further includes the terminal identifier of the to-be-authenticated terminal; and the key obtaining and verification module 630 includes:

a first local search unit, configured to traverse local cache of the cloud server according to the terminal identifier included in the to-be-authenticated information, and determine, when a verification key corresponding to the terminal identifier is found, that there is the verification key matching the to-be-authenticated terminal stored in the cloud server;

a first response unit, configured to traverse, when the first local search unit does not find the verification key corresponding to the terminal identifier, a plurality of locally stored verification keys to obtain the verification key matching the to-be-authenticated terminal from the plurality of verification keys, and perform, according to the obtained verification key, verification on the verification information; and a second response unit, configured to perform, when the first local search unit find the verification key corresponding to the terminal identifier, verification on the verification information according to the found verification key.

In some other exemplary embodiments, the verification key includes a pairwise master key; and the first response unit includes:

a second local search unit, configured to traverse locally stored pairwise master keys, and perform verification on the verification information according to a currently traversed pairwise master key; a third response unit, configured to perform, when verification on the verification information fails, verification on the verification information according to a next pairwise master key until the verification on the verification information succeeds; and a fourth searching unit, configured to use a pairwise master key according to which the verification on the verification information succeeds as the verification key matching the to-be-authenticated terminal.

In some other exemplary embodiments, the verification information is generated by the to-be-authenticated terminal based on a user input key; and the second local search unit includes:

a pairwise temp key calculation subunit, configured to calculate a pairwise temp key according to the currently traversed pairwise master key; a message integrity code calculation subunit, configured to obtain a message integrity code based on the calculated pairwise temp key; and a message integrity code verification subunit, configured to perform verification on the user input key according to the message integrity code, and determine, when the verification succeeds, that the verification on the verification information succeeds.

In some other exemplary embodiments, the pairwise temp key calculation subunit includes:

a related information obtaining subunit: configured to obtain, from the to-be-authenticated information, at least one piece of the following information related to the user input key: a terminal random value generated by the to-be-authenticated terminal, the terminal identifier of the to-be-authenticated terminal, an access point random value generated by the wireless access point device, and a device identifier of the wireless access point device; and a pseudo-random function operation subunit, configured to perform a pseudo-random function operation according to the currently traversed pairwise master key and the information related to the user input key, to obtain the pairwise temp key.

In another exemplary embodiment, the message integrity code calculation subunit includes:

a key obtaining subunit, configured to obtain a key confirmation key according to the pairwise temp key; and an encryption operation subunit, configured to perform, according to the key confirmation key, an encryption operation on a message transmitted by the to-be-authenticated terminal, to obtain the message integrity code, the message transmitted by the to-be-authenticated terminal including the terminal random value generated by the to-be-authenticated terminal.

In some other embodiments, the apparatus further includes:

an associative storage module, configured to associatively store the verification key matching the to-be-authenticated terminal with the terminal identifier of the to-be-authenticated terminal.

In some other embodiments, the apparatus further includes:

an initialization configuration module, configured to configure initialization information, the initialization information including a unique pre-shared key of each user in an enterprise and a service set identifier code corresponding to the enterprise, all wireless access point devices deployed in the enterprise having the same service set identifier code; and a key calculation and storage module, configured to separately calculate a verification key of each user according to the unique pre-shared key of each user in the enterprise and the service set identifier code corresponding to the enterprise, and locally store the verification key of each user.

Figure 14:
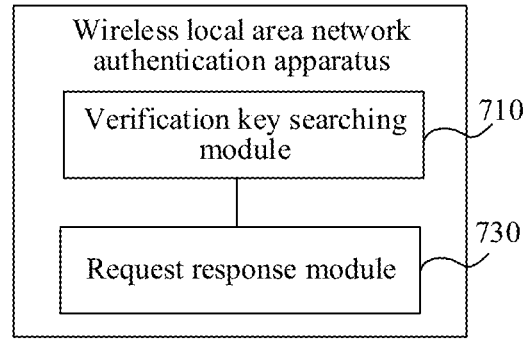
FIG. 14 is a block diagram of a wireless local area network authentication apparatus according to some other embodiments of this application.

FIG. 14 is a block diagram of a wireless local area network authentication apparatus according to some other exemplary embodiments of this application. As shown in FIG. 14, the apparatus includes:

a verification key searching module 710, configured to locally search for, according to the terminal identifier of the to-be-authenticated terminal when verification information transmitted by a to-be-authenticated terminal is received, a verification key associatively stored with a terminal identifier, the verification key associated with the terminal identifier being issued by a cloud server after the cloud server obtains, after receiving to-be-authenticated information historically transmitted by a wireless access point device, a verification key matching the to-be-authenticated terminal, and verification performed according to the obtained verification key by the cloud server on verification information included in the historically transmitted to-be-authenticated information succeeds; and a request response module 730, configured to complete, when the verification key associatively stored with the terminal identifier is found, authentication on the to-be-authenticated terminal according to the verification key, and establish, in response to a wireless local area network connection request, a wireless local area network connection with the to-be-authenticated terminal after the authentication succeeds.

In some other embodiments, the apparatus further includes:

a to-be-authenticated information transmitting module, configured to transmit the to-be-authenticated information to a cloud server when the verification key associatively stored with the terminal identifier is not found, the to-be-authenticated information including the verification information generated by the to-be-authenticated terminal; a pairwise master key receive module, configured to receive a pairwise master key matching the to-be-authenticated terminal returned by the cloud server after verification performed by the cloud server side on the verification information succeeds; and a pairwise master key associative storage module, configured to use the pairwise master key returned by the cloud server as the verification key, and associatively store the verification key with the terminal identifier of the to-be-authenticated terminal.

In some other exemplary embodiments, the verification information is generated by the to-be-authenticated terminal based on a user input key; and the apparatus further includes:

a pairwise temp key obtaining module, configured to calculate a pairwise temp key according to the verification key associated with the terminal identifier; a message integrity code obtaining module, configured to obtain a message integrity code based on the calculated pairwise temp key; and a verification pass response module, configured to preform verification on the user input key according to the message integrity code, and perform, when the verification succeeds, the step of establishing the wireless local area network connection with the to-be-authenticated terminal in response to the wireless local area network connection request.

It should be noted that, the apparatuses provided in the foregoing embodiments and the method provided in the foregoing embodiments belong to the same idea. Specific operation manners of the modules and units have been described in detail in the method embodiments. Details are not described herein again.

It should be further noted that, when the apparatus provided in the foregoing embodiments is deployed in the enterprise wireless local area network system, the wireless terminal does not re-transmit a wireless local area network connection request to the access point device due to authentication timeout, and the enterprise does not need to purchase the high-priced access controller. In this case, the stability of the enterprise wireless local area network system can be achieved, and high connection efficiency can be obtained by the enterprise wireless local area network system.

An embodiment of this application further provides an electronic device, including a processor and a memory, the memory storing computer-readable instructions, and the computer-readable instructions, when executed by the processor, implementing the wireless local area network authentication method as described above.

Figure 15:
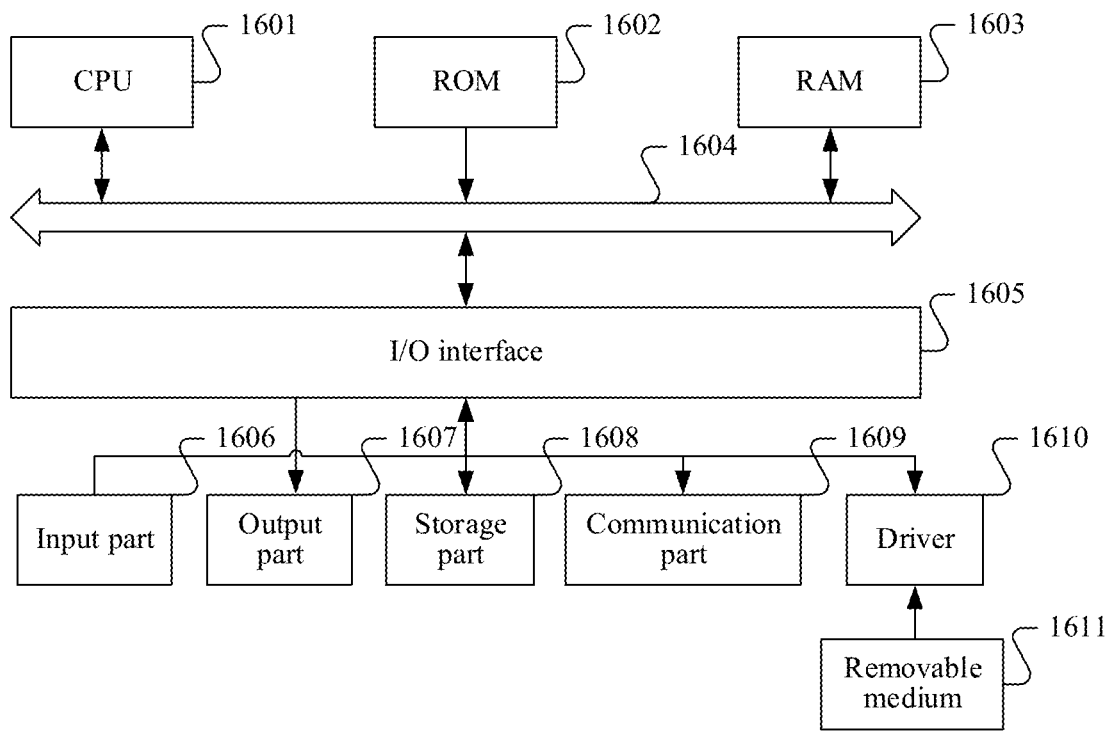
FIG. 15 is a schematic structural diagram of a computer system adapted to implement an electronic device of an embodiment of this application according to some embodiments of this application.

FIG. 15 is a schematic structural diagram of a computer system adapted to implement an electronic device according to an embodiment of this application.

It should be noted that, the computer system 1600 of the electronic device shown in FIG. 15 is merely an example, and does not constitute any limitation on functions and use ranges of the embodiments of this application.

As shown in FIG. 15, the computer system 1600 includes a central processing unit (CPU) 1601, which may perform various suitable actions and processing based on a program stored in a read-only memory (ROM) 1602 or a program loaded from a storage part 1608 into a random access memory (RAM) 1603, for example, perform the method described in the foregoing embodiments. The RAM 1603 further stores various programs and data required for system operations. The CPU 1601, the ROM 1602, and the RAM 1603 are connected to each other through a communication bus 1604. An input/output (I/O) interface 1605 is also connected to the bus 1604.

The following components are connected to the I/O interface 1605: an input part 1606 including a keyboard, a mouse, or the like; an output part 1607 including a cathode ray tube (CRT), a liquid crystal display (LCD), a speaker, or the like; a storage part 1608 including hard disk, or the like; and a communication part 1609 including a network interface card such as a local area network (LAN) card or a modem. The communication part 1609 performs communication processing by using a network such as the Internet. A driver 1610 is also connected to the I/O interface 1605 as required. A removable medium 1611, such as a magnetic disk, an optical disc, a magneto-optical disk, or a semiconductor memory, is installed on the drive 1610 as required, so that a computer program read from the removable medium is installed into the storage part 1608 as required.

Particularly, according to an embodiment of this application, the processes described above by referring to the flowcharts may be implemented as computer software programs. For example, an embodiment of this application includes a computer program product. The computer program product includes a computer program stored in a non-transitory computer-readable storage medium. The computer program includes a computer program used for performing a method shown in the flowchart. In such an embodiment, the computer program may be downloaded and installed from the network through the communication portion 1609, and/or installed from the removable medium 1611. When the computer program is executed by the CPU 1601, the various functions defined in the system of this application are executed.

It should be noted that, the computer-readable medium shown in the embodiments of this application may be a computer-readable signal medium or a computer-readable storage medium or any combination thereof. The computer-readable storage medium may be, for example, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof.

Related units described in the embodiments of this application may be implemented in a software manner, or may be implemented in a hardware manner, and the unit described can also be set in a processor. Names of these units do not constitute a limitation on the units in a case.

According to another aspect of this application, a computer-readable storage medium is further provided, storing a computer program, the computer program, when executed by a processor, implementing the wireless local area network authentication method as described above. The computer-readable storage medium may be included in the electronic device described in the foregoing embodiments, or may exist alone and is not disposed in the electronic device.

According to another aspect of this application, a computer program product or a computer program is provided, the computer program product or the computer program including computer instructions, the computer instructions being stored in a computer-readable storage medium. The processor of the computer device reads the computer instructions from the computer-readable storage medium, and the processor executes the computer instructions, to cause the computer device to perform the wireless local area network authentication method provided in the foregoing embodiments.

The foregoing descriptions are merely exemplary embodiments of this application, and are not intended to limit the implementations of this application. A person of ordinary skill in the art may conveniently make variations or modifications according to the main idea and spirit of this application. Therefore, the protection scope of this application shall be subject to the protection scope of the claims.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs transmission and/or verification. In practical application, the foregoing functions may be allocated to and completed by different functional modules according to requirements, that is, an inner structure of a device is divided into different functional modules to implement all or a part of the functions described above.

What is claimed is:

1. A wireless local area network authentication method performed by a cloud server, the method comprising:
   receiving, by the cloud server, information to be authenticated sent by a wireless access point device, the information to be authenticated containing verification information generated by a terminal to be authenticated, wherein the terminal is a wireless terminal provided by the wireless access point device for accessing a wireless local area network;
   in accordance with a determination by the cloud server that the cloud server locally stores a verification key that matches the terminal, obtaining by the cloud server the locally stored verification key and performing verification on the verification information according to the verification key; and
   when the verification on the verification information succeeds, returning the verification key to the wireless access point device so that the wireless access point device associatively stores the verification key with a terminal identifier of the terminal, and completes authentication on the terminal according to the verification key.

2. The method according to claim 1, wherein:
   the information to be authenticated further comprises the terminal identifier of the terminal;
   the cloud server associatively stores the terminal identifier of the terminal with the verification key matching the terminal; and
   the method further comprises before obtaining the locally stored verification key:
   traversing, by the cloud server, local cache of the cloud server according to the terminal identifier; and
   determining, when the verification key corresponding to the terminal identifier is found in accordance with the traversing, that the cloud server stores the verification key matching the terminal.

3. The method according to claim 1 further comprising:
   in accordance with a determination by the cloud server that the cloud server does not locally store a verification key that matches the terminal, traversing a plurality of verification keys stored locally in the cloud server to determine, from the plurality of verification keys, a first verification key that matches the terminal; and
   after the verification on the verification information succeeds, storing in the cloud server an association between the first verification key and the terminal identifier of the terminal.

4. The method according to claim 3, wherein:
   the first verification key comprises a pairwise master key that is stored in the cloud server; and
   traversing the plurality of verification keys comprises:
   traversing one or more locally stored pairwise master keys, and performing verification on the verification information according to a currently traversed pairwise master key;
   when the verification on the verification information based on the currently traversed pairwise master key fails, performing verification on the verification information according to a next pairwise master key until the verification on the verification information succeeds according to a first pairwise master key; and
   using the first pairwise master key as the first verification key matching the terminal.

5. The method according to claim 4, wherein the verification information is generated by the terminal based on a user input key; and traversing the one or more locally stored pairwise master keys includes:
   calculating a pairwise temp key according to the currently traversed pairwise master key;
   obtaining a message integrity code based on the calculated pairwise temp key; and
   performing verification on the user input key according to the message integrity code, and determining, when the verification succeeds, that the verification on the verification information succeeds.

6. The method according to claim 5, wherein calculating the pairwise temp key includes:
   obtaining, from the information to be authenticated, at least one piece of the following information related to the user input key: a terminal random value generated by the to-be-authenticated terminal, the terminal identifier of the terminal, an access point random value generated by the wireless access point device, and a device identifier of the wireless access point device; and
   performing a pseudo-random function operation according to the currently traversed pairwise master key and the information related to the user input key, to obtain the pairwise temp key.

7. The method according to claim 5, wherein obtaining the message integrity code comprises:
   obtaining a key confirmation key according to the pairwise temp key; and
   performing, according to the key confirmation key, an encryption operation on a message transmitted by the terminal, to obtain the message integrity code, the message transmitted by the terminal comprising a terminal random value generated by the terminal.

8. The method according to claim 1, further comprising before receiving information to be authenticated:
   configuring initialization information, the initialization information comprising a unique pre-shared key of each user in an enterprise and a service set identifier code corresponding to the enterprise, all wireless access point devices deployed in the enterprise having the same service set identifier code; and
   separately calculating a verification key of each user according to the unique pre-shared key of each user in the enterprise and the service set identifier code corresponding to the enterprise, and locally storing the verification key of each user.

9. A cloud server system, comprising:
   one or more processors; and
   memory storing one or more programs, the one or more programs comprising instructions that, when executed by the one or more processors, cause the one or more processors to perform operations comprising:
   receiving, by the cloud server system, information to be authenticated sent by a wireless access point device, the information to be authenticated containing verification information generated by a terminal to be authenticated, wherein the terminal is a wireless terminal provided by the wireless access point device for accessing a wireless local area network;
   in accordance with a determination by the cloud server system that the cloud server system locally stores a verification key that matches the terminal, obtaining by the cloud server system the locally stored verification key and performing verification on the verification information according to the verification key; and when the verification on the verification information succeeds, returning the verification key to the wireless access point device so that the wireless access point device associatively stores the verification key with a terminal identifier of the terminal, and completes authentication on the terminal according to the verification key.

10. The cloud server system according to claim 9, wherein:
the information to be authenticated further comprises the terminal identifier of the terminal;
the cloud server system associatively stores the terminal identifier of the terminal with the verification key matching the terminal; and
the operations further include before obtaining the locally stored verification key:
traversing, by the cloud server, local cache of the cloud server according to the terminal identifier; and
determining, when the verification key corresponding to the terminal identifier is found in accordance with the traversing, that the cloud server stores the verification key matching the terminal.

11. The cloud server system according to claim 9, the operations further comprising:
in accordance with a determination by the cloud server system that the cloud server system does not locally store a verification key that matches the terminal, traversing a plurality of verification keys stored locally in the cloud server system to determine, from the plurality of verification keys, a first verification key that matches the terminal; and
after the verification on the verification information succeeds, storing in the cloud server system an association between the first verification key and the terminal identifier of the terminal.

12. The cloud server system according to claim 11, wherein:
the first verification key comprises a pairwise master key that is stored in the cloud server system; and
traversing the plurality of verification keys comprises:
traversing one or more locally stored pairwise master keys, and performing verification on the verification information according to a currently traversed pairwise master key;
when the verification on the verification information based on the currently traversed pairwise master key fails, performing verification on the verification information according to a next pairwise master key until the verification on the verification information succeeds according to a first pairwise master key; and
using the first pairwise master key as the first verification key matching the terminal.

13. The cloud server system according to claim 12, wherein the verification information is generated by the terminal based on a user input key; and traversing the one or more locally stored pairwise master keys includes:
calculating a pairwise temp key according to the currently traversed pairwise master key;
obtaining a message integrity code based on the calculated pairwise temp key; and
performing verification on the user input key according to the message integrity code, and determining, when the verification succeeds, that the verification on the verification information succeeds.

14. The cloud server system according to claim 13, wherein calculating the pairwise temp key includes:
obtaining, from the information to be authenticated, at least one piece of the following information related to the user input key: a terminal random value generated by the to-be-authenticated terminal, the terminal identifier of the terminal, an access point random value generated by the wireless access point device, and a device identifier of the wireless access point device; and
performing a pseudo-random function operation according to the currently traversed pairwise master key and the information related to the user input key, to obtain the pairwise temp key.

15. The cloud server system according to claim 13, wherein obtaining the message integrity code comprises:
obtaining a key confirmation key according to the pairwise temp key; and
performing, according to the key confirmation key, an encryption operation on a message transmitted by the terminal, to obtain the message integrity code, the message transmitted by the terminal comprising a terminal random value generated by the terminal.

16. The cloud server system according to claim 9, the operations further comprising, before receiving information to be authenticated:
configuring initialization information, the initialization information comprising a unique pre-shared key of each user in an enterprise and a service set identifier code corresponding to the enterprise, all wireless access point devices deployed in the enterprise having the same service set identifier code; and
separately calculating a verification key of each user according to the unique pre-shared key of each user in the enterprise and the service set identifier code corresponding to the enterprise, and locally storing the verification key of each user.

17. A non-transitory computer-readable storage medium storing one or more instruction that, when executed by one or more processors of a cloud server system, cause the one or more processors to perform operations comprising:
receiving, by the cloud server system, information to be authenticated sent by a wireless access point device, the information to be authenticated containing verification information generated by a terminal to be authenticated, wherein the terminal is a wireless terminal provided by the wireless access point device for accessing a wireless local area network;
in accordance with a determination by the cloud server system that the cloud server system locally stores a verification key that matches the terminal, obtaining by the cloud server system the locally stored verification key and performing verification on the verification information according to the verification key; and
when the verification on the verification information succeeds, returning the verification key to the wireless access point device so that the wireless access point device associatively stores the verification key with a terminal identifier of the terminal, and completes authentication on the terminal according to the verification key.

18. The non-transitory computer-readable storage medium according to claim 17, wherein:
the information to be authenticated further comprises the terminal identifier of the terminal;

the cloud server system associatively stores the terminal identifier of the terminal with the verification key matching the terminal; and the method further comprises before obtaining the locally stored verification key:

traversing, by the cloud server system, local cache of the cloud server according to the terminal identifier; and determining, when the verification key corresponding to the terminal identifier is found in accordance with the traversing, that the cloud server stores the verification key matching the terminal.

19. The non-transitory computer-readable storage medium according to claim 17, the operations further comprising:

in accordance with a determination by the cloud server system that the cloud server system does not locally store a verification key that matches the terminal, traversing a plurality of verification keys stored locally in the cloud server system to determine, from the plurality of verification keys, a first verification key that matches the terminal; and after the verification on the verification information succeeds, storing in the cloud server system an association between the first verification key and the terminal identifier of the terminal.

20. The non-transitory computer-readable storage medium according to claim 19, wherein:

the first verification key comprises a pairwise master key that is stored in the cloud server system; and traversing the plurality of verification keys comprises:

traversing one or more locally stored pairwise master keys, and performing verification on the verification information according to a currently traversed pairwise master key;

when the verification on the verification information based on the currently traversed pairwise master key fails, performing verification on the verification information according to a next pairwise master key until the verification on the verification information succeeds according to a first pairwise master key; and using the first pairwise master key as the first verification key matching the terminal.

* * * * *